(12) United States Patent  
Chen et al.

(10) Patent No.: US 11,550,055 B2  
(45) Date of Patent: Jan. 10, 2023

(54) RANGE-FINDING SYSTEM AND METHOD FOR DATA COMMUNICATION WITHIN THE SAME

(71) Applicant: SUTENG INNOVATION TECHNOLOGY CO., LTD., Shenzhen (CN)

(72) Inventors: Zhihua Chen, Shenzhen (CN); Letian Liu, Shenzhen (CN); Chunxin Qiu, Shenzhen (CN); Xujun Tan, Shenzhen (CN); Xiaojun Zhou, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 94 days.

(21) Appl. No.: 17/035,685

(22) Filed: Sep. 29, 2020

(65) Prior Publication Data

US 2021/0026016 A1    Jan. 28, 2021

Related U.S. Application Data

(63) Continuation of application No. 15/930,426, filed on May 12, 2020, now Pat. No. 10,823,853, which is a (Continued)

(30) Foreign Application Priority Data

Sep. 28, 2018 (CN) .......................... 201811139915.5  
Oct. 30, 2018 (CN) .......................... 201811273619.4  
Sep. 12, 2019 (CN) .......................... 201910866688.4

(51) Int. Cl.  
*G01S 17/88* (2006.01)  
*G01S 7/481* (2006.01)  
(Continued)

(52) U.S. Cl.  
CPC .............. *G01S 17/88* (2013.01); *G01S 7/487* (2013.01); *G01S 7/4811* (2013.01);  
(Continued)

(58) Field of Classification Search  
CPC ........ G01S 17/88; G01S 7/4811; G01S 7/487; G01S 7/481; H04B 10/1125; H04B 10/40;  
(Continued)

(56) References Cited

U.S. PATENT DOCUMENTS 4,558,320 A     12/1985 Pedrazza  
2017/0125892 A1*  5/2017 Arbabian ............. H04B 13/005  
(Continued)

FOREIGN PATENT DOCUMENTS

CN      201336071 A    10/2009  
CN      101997877 B    11/2013  
(Continued)

OTHER PUBLICATIONS

First Office action issued in related Chinese Application No. 201910866688.4, dated Nov. 4, 2019, 12 pages.  
(Continued)

*Primary Examiner* — Yuqing Xiao  
*Assistant Examiner* — Amir J Askarian  
(74) *Attorney, Agent, or Firm* — Bayes PLLC

(57) ABSTRACT

The present disclosure provides a range-finding system capable of data communication. The range-finding system includes a rangefinder for acquiring ranging data, a magnetic ring unit having at least two communication channels, and a data processing and control unit. Each communication channel includes a magnetic ring. The magnetic ring unit transmits the ranging data as downlink data from the  
(Continued)

rangefinder to the data processing and control unit via one or more of the communication channels.

17 Claims, 21 Drawing Sheets

Related U.S. Application Data continuation of application No. PCT/CN2019/108662, filed on Sep. 27, 2019.

(51) Int. Cl.
  *G01S 7/487* (2006.01)
  *H04B 10/112* (2013.01)
  *H04B 10/40* (2013.01)
  *H04B 5/00* (2006.01)
  *H04B 5/02* (2006.01)

(52) U.S. Cl.
  CPC ......... *H04B 5/0025* (2013.01); *H04B 5/0031* (2013.01); *H04B 5/0037* (2013.01); *H04B 5/0043* (2013.01); *H04B 5/02* (2013.01); *H04B 10/1125* (2013.01); *H04B 10/40* (2013.01)

(58) Field of Classification Search
  CPC .. H04B 5/0025; H04B 5/0031; H04B 5/0037; H04B 5/0043; H04B 5/02
  See application file for complete search history.

(56) References Cited

U.S. PATENT DOCUMENTS

| | | | |
|---|---|---|---|
| 2018/0123412 A1* | 5/2018 | Karplus | ................ H02K 1/2793 |
| 2019/0297554 A1* | 9/2019 | Barzegar | ............. H04L 41/0816 |
| 2020/0025879 A1* | 1/2020 | Pacala | .................... H05K 1/181 |

FOREIGN PATENT DOCUMENTS

| | | |
|---|---|---|
| CN | 104038253 A | 9/2014 |
| CN | 106128088 A | 11/2016 |
| CN | 106655535 A | 5/2017 |
| CN | 206235732 U | 6/2017 |
| CN | 107078840 A | 8/2017 |
| CN | 208078739 U | 11/2018 |
| CN | 208836140 U | 5/2019 |
| CN | 105794290 B | 6/2019 |
| CN | 110167084 A | 8/2019 |
| CN | 209330532 U | 8/2019 |
| KR | 101444268 B1 | 9/2014 |

OTHER PUBLICATIONS

First Office action issued in related Chinese Application No. 201811273619.4, dated Mar. 5, 2020, 5 pages.

\* cited by examiner

1200

Acquire, by a rangefinder, ranging data
1202

Transmit, via a magnetic ring unit comprising one or more communication channels, ranging data as downlink data from the rangefinder to a data processing and control unit
1204

Receive the ranging data as downlink data from the rangefinder at a data processing and control unit
1206

Acquire, by a data processing and control unit, control data
1302

Transmit, via a magnetic ring unit comprising a communication channel, the control data as uplink data to a rangefinder from the data processing and control unit
1304

Receive the control data as uplink data from the data processing and control unit at the rangefinder
1306

Perform a control action on the rangefinder
1308

FIG. 13

1400
Receiving downlink data via a magnetic ring unit comprising one or more communication channels
1402
Switching between a downlink transmission mode and an uplink transmission mode
1404
Sending uplink data via the magnetic ring unit
1406
FIG. 14

RANGE-FINDING SYSTEM AND METHOD FOR DATA COMMUNICATION WITHIN THE SAME

CROSS-REFERENCE TO RELATED APPLICATIONS

The present application is a continuation of U.S. patent application Ser. No. 15/930,426, filed May 12, 2020, which in turn is a bypass continuation of PCT/CN2019/108662 with an international filing date of Sep. 27, 2019, and a priority date of Sep. 28, 2018, the entirety of each of which is hereby incorporated herein by reference. The present application is also related to and claims the benefit and priority of CN 201811139915.5 filed Sep. 28, 2018, CN 201811273619.4 filed Oct. 30, 2018, and CN 201910866688.4 filed Sep. 12, 2019, the entirety of each of which is hereby incorporated herein by reference.

TECHNICAL FIELD

The present disclosure relates to range-finding systems and methods, such as light detection and ranging (LiDAR) systems and methods using the same, and more particularly to range-finding systems and methods using magnetic rings for one or both of data communication or power transmission.

BACKGROUND

Range-finding systems, such as LiDAR systems, have found their way into a wide variety of high-tech applications, such as autonomous driving, robotic navigation, unmanned aerial vehicles (UAVs). They are instrumental in spatial modeling and detection of the surrounding environment. A LiDAR system is used to detect feature parameters of an object in the environment, such as its position, height, speed, target distance, attitude, and contours. Such parameters may be used to produce high-definition maps of the surrounding environment. For example, a typical LiDAR system measures a distance to a target by illuminating the target with pulsed laser beams and receiving the reflected pulses with a sensor, such as a photodetector. Differences in the wavelengths, phases, and/or return time of the laser beams can then be used to calculate the distance and to make digital three-dimensional (3D) representations of the target. Because using a laser beam as the incident light can map physical features with high resolution, a LiDAR system is particularly suitable for the abovementioned applications.

Range-finding systems normally include means for transmitting data, such as the feature parameters of the object, to the other part of the system. Because some range-finding systems rotate at a high speed, data communication between the rotating part and the stationary part becomes a major bottleneck for the system to improve its speed of processing. Some conventional range-finding systems use slip rings to communicate data while the system is rotating. Specifically, data is communicated by friction contact between components inside the slip rings. However, because high-speed rotation of the range-finding system causes severe abrasion of the slip rings, such a system requires frequent maintenance and repair. The quality of transmission also significantly deteriorates in rotating operation due to the wear and tear of the slip rings.

Embodiments of the present disclosure address the above problems by providing range-finding systems and methods, such as LiDAR systems and methods using the same, that use magnetic rings for one or both of data communication or power transmission.

SUMMARY

Embodiments of the disclosure provide a range-finding system capable of data communication. The range-finding system includes a rangefinder for acquiring ranging data, a magnetic ring unit having at least two communication channels, and a data processing and control unit. Each communication channel includes a magnetic ring. The magnetic ring unit transmits the ranging data as downlink data from the rangefinder to the data processing and control unit via one or more of the communication channels.

Embodiments of the disclosure also provide a magnetic-ring-based communication system. The communication system includes a switch unit receiving a downlink control signal and an uplink control signal, a mainboard control unit transmitting a downlink data and receiving an uplink data, a backboard control unit transmitting an uplink data and receiving a downlink data, a communication channel having a mainboard magnetic ring unit and a backboard magnetic ring unit, and a power channel for transmitting a power signal from the backboard control unit to the mainboard control unit. When the switch unit receives the downlink control signal, the mainboard control unit transmits the downlink data to the backboard control unit via the communication channel. When the switch unit receives the uplink control signal, the backboard control unit transmits the uplink data to the mainboard control unit via the communication channel. The backboard control unit supplies power to the mainboard control unit via the power channel.

Embodiments of the disclosure further provide a method for data transmission within a range-finding system. The method includes acquiring ranging data by a rangefinder, transmitting, via a magnetic ring unit comprising a communication channel, the ranging data as downlink data from the rangefinder to a data processing and control unit, and receiving the ranging data at a data processing and control unit. Each communication channel includes a magnetic ring.

It is to be understood that both the foregoing general description and the following detailed description are exemplary and explanatory only and are not restrictive of the invention, as claimed.

BRIEF DESCRIPTION OF THE DRAWINGS

FIG. 12 illustrates a method for data transmission within a range-finding system, according to embodiments of the disclosure.

FIG. 13 illustrates a further method for data transmission within a range-finding system, according to embodiments of the disclosure.

FIG. 14 illustrates a method of operating a range-finding system, according to embodiments of the disclosure.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

A range-finding system according to the present disclosure may be capable of data communication. It may include a rangefinder. The rangefinder may use acoustic or electromagnetic waves to detect the distance between the detected objects and the rangefinder. Typical range-finding methods that may be compatible with the range-finding system of the present disclosure include sonar, ultrasonic range-finding, radar, laser, LiDAR, and the like. Although the majority of the embodiments and descriptions in the present disclosure are directed to the LiDAR technology, a person of skill in the art would know that the same disclosure may be applied to range-finding systems employing other range-finding methods as well.

Figure 1:
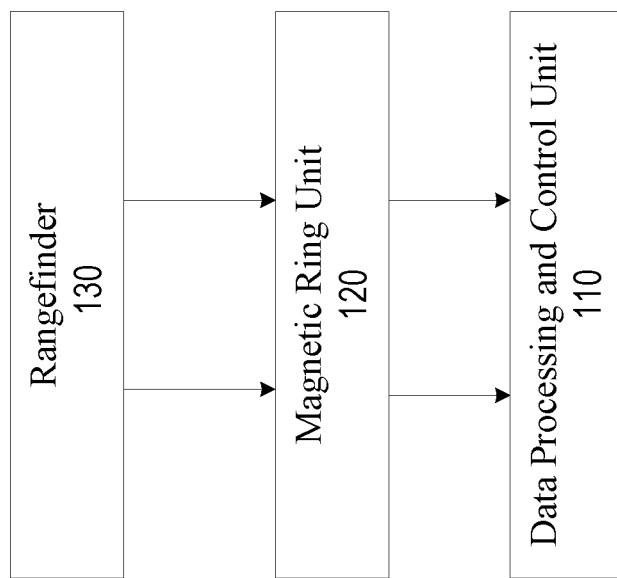
FIG. 1 illustrates a block diagram of a first exemplary range-finding system, according to embodiments of the disclosure.

FIG. 1 illustrates a block diagram of a first exemplary range-finding system 100, according to embodiments of the disclosure. Range-finding system 100 may be a device installed on a moving vehicle, whether manned or unmanned. Examples of such a vehicle include airplane, drone, boat, car, bus, truck, bicycle, or the like. By acquiring data through, for example, scanning the surrounding environment, range-finding system 100 may assist the vehicle in perceiving its spatial location and objects (such as roadblocks, pedestrians, other vehicles, trees, signs, traffic lights, buildings, animals, etc.) in the environment. One of the key data range-finding system 100 may acquire is its distance from the objects. Together with other navigation information obtained by onboard sensors, such as GPS and IMU sensors, the acquired data enable the moving vehicle mounted with range-finding system 100 to recognize its location on a virtual map. As the frequency at which range-finding system 100 acquires data increases, the precision of vehicle positioning is also improved. Moreover, when the data are acquired at a sufficiently high density, the contours and other three-dimensional (3D) information of the surrounding objects may also be reconstructed by converting the data into point clouds for 3D modeling. The embodiments described herein disclose systems and methods that increase the transmission speed of the acquired data in the range-finding system, thus solving the thorny problem of congested data transmission path that hinders the development of high-definition (HD) maps and autonomous driving.

Figure 2:
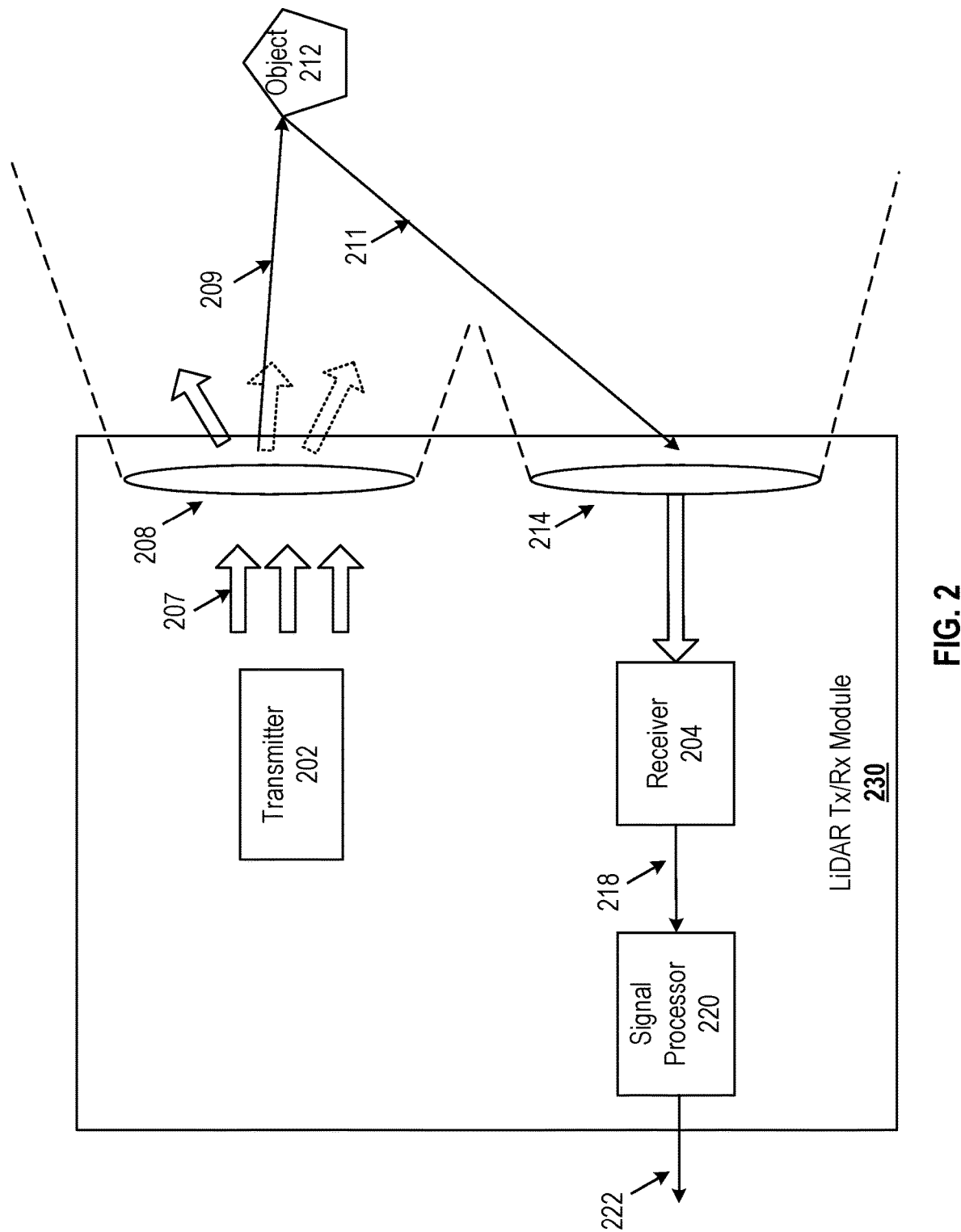
FIG. 2 illustrates a block diagram of an exemplary LiDAR transmission and receiving module, according to embodiments of the disclosure.

Consistent with embodiments according to the present disclosure, range-finding system 100 may include a data processing and control unit 110, a magnetic ring unit 120, and a rangefinder 130. Range-finding system 100 according to the present disclosure may use various ranging technologies, including radar, sonar, laser, LiDAR, or the like. Use LiDAR as an example. FIG. 2 illustrates a block diagram of an exemplary LiDAR transmission and receiving module (LiDAR Tx/Rx module) 230, according to embodiments of the disclosure. LiDAR Tx/Rx module 230 may be an example of rangefinder 130 of range-finding system 100 using the LiDAR technology. LiDAR Tx/Rx module 230 may include a transmitter 202 and a receiver 204. Transmitter 202 may emit laser beams within a scan angle as it moves (e.g., rotates, swings, etc.). The scan angle can be a horizontal angle, a vertical angle, or a combination of both. Transmitter 202 may include a laser source (not shown) that further includes one or more laser emitters. Each laser emitter may emit a laser beam. When there are multiple laser emitters, these emitters may form a laser emitter array. The laser emitters according to the present disclosure may generate laser beams in the ultraviolet, visible, or near infrared wavelength range.

In some embodiments, when leaving LiDAR Tx/Rx module 230, one of the multiple laser beams 207, laser beam 209, may be projected to an object 212 in a first direction. Object 212 that reflects laser beam 209 may include a wide range of objects, including, for example, metallic objects, non-metallic objects, vehicles, bicycles, pedestrians, billboards, road signs, cement pavements, rocks, rain, chemical compounds, aerosols, clouds, and even single molecules. LiDAR Tx/Rx module 230 may further include a transmitter optical unit 208, which may be used to collimate laser beams 207 and/or to focus laser beams for emission to the surrounding environment.

In some embodiments, receiver 204 may be configured to detect a return beam 211 that is reflected by object 212 from laser beam 209. Receiver 204 can collect return beams reflected by object 212 and output electrical signals indicating the intensity of the return beams. As illustrated in FIG. 2, LiDAR Tx/Rx module 230 may also include a receiver optical unit 214. Receiver optical unit 214 may be configured to collect light from all directions within its field of view (FOV). As an example, return beam 211 may be collected by receiver optical unit 214.

Receiver 204 may include a photodetector array (not shown), which may further include a plurality of photodetectors and may be configured to detect return beam 211 reflected from object 212. In some embodiments, each of the photodetectors in the photodetector array may convert a laser light (e.g., return beam 211) collected by receiver optical unit 214 into an electrical signal 218 (e.g., a current or a voltage signal). Electrical signal 218 may be generated when photons are absorbed in a photodiode. In some embodiments, LiDAR Tx/Rx module 230 may include a signal processor 220 configured to process electrical signal 218.

Referring back to FIG. 1, range-finding system 100 uses an unconventional approach to transmit acquired data 222. Conventionally, the lifespan of a rotating rangefinder (e.g., a rotating LiDAR system) is limited by wear and tear between the rotating part and the stationary part of the rangefinder, because the rotating part and the stationary part directly contact each other with cable transmission. As a result, when the rangefinder rotates, the contacting area between the two parts is susceptible to abrasion and failure, and the stability of signal transmission cannot be guaranteed either. Magnetic ring unit 120 according to the present disclosure uses near-field wireless communication to transmit acquired data 222, thus getting rid of the past problems associated with direct contact. More specifically, magnetic ring unit 120 may use a magnetic ring to establish a channel for near-field wireless communication by electromagnetic field coupling. It is understood that such a magnetic-ring-based communication may be applied to any other data communication device where direct electrical connections are unfeasible, regardless of whether there are relative movements between different parts of the device.

Figure 3A:
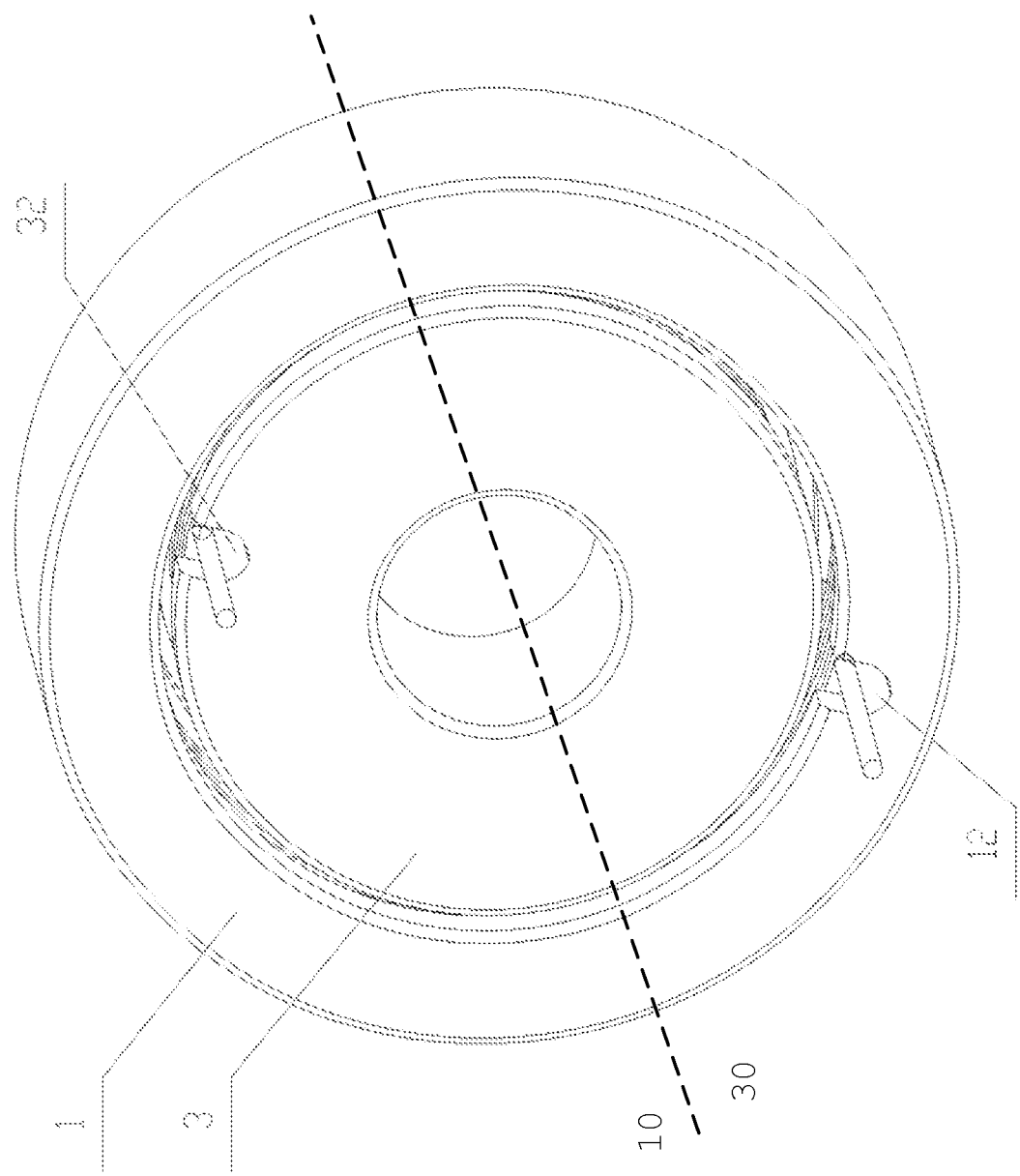
FIG. 3A illustrates a front view of an exemplary magnetic ring, according to embodiments of the disclosure.

FIG. 3A illustrates a front view of an exemplary magnetic ring, according to embodiments of the disclosure. The magnetic ring may include an inner ring 3 and an outer ring 1. Inner ring 3 may be connected to a stationary part (not shown). Outer ring 1 may be connected to a rotating part (not shown). Outer ring 1 may have a center axis 10 passing through its center. Inner ring 3 may have a center axis 30 passing through its center. In the embodiment shown in FIG. 3A, center axis 10 may coincide with center axis 30. Each ring, if connected to the rotating part, may rotate around the center axis. When the rotating part rotates and generates a relative motion to the stationary part, outer ring 1 may also have a relative motion to the inner ring. A space is provided between outer ring 1 and inner ring 3 so that there is no abrasion between the two rings when rotating, thus increasing the lifespan of the magnetic ring. For example, outer ring 1 may rotate along with the rotating part while the inner ring remains stationary. As a result, when current flows in an inner coil 4 (shown in FIG. 3E below) provided with inner ring 3 and in an outer coil 2 (shown in FIG. 3C below) provided with outer ring 1, electromagnetic field coupling may be created. Outer ring 1 and inner ring 3 also respectively includes an outer coil opening 12 and an inner coil opening 32, which will be discussed in more detail below in conjunction with FIGS. 3B and 3D.

In some other embodiments, it is also conceived that the inner ring may be connected to a rotating part (e.g., axle) while the outer ring may be connected to a stationary part. For the same reason stated above, this configuration may also generate electromagnetic field coupling between the two coils of the magnetic ring. In yet some other embodiments, both the inner ring and the outer ring may be connected to a rotating part, and the rotation speed of these two rings are configured to vary between each other; thus, electromagnetic field coupling between the two coils of the magnetic ring may also be generated.

Figure 3B:
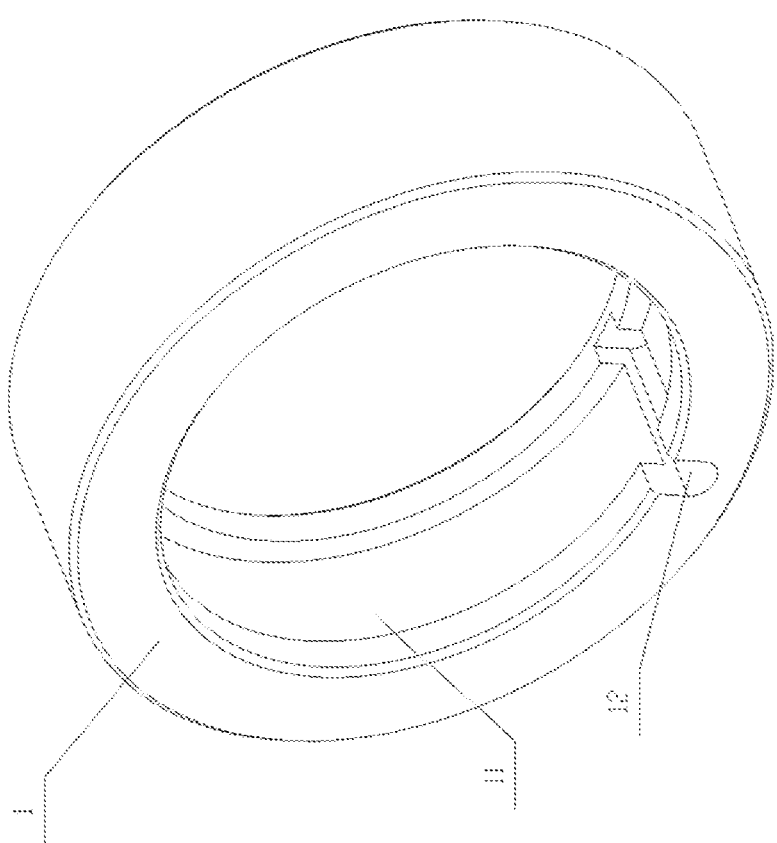
FIG. 3B illustrates an oblique front view of an exemplary outer ring, according to embodiments of the disclosure.

FIG. 3B illustrates an oblique front view of an exemplary outer ring, according to embodiments of the disclosure. Outer ring 1 may include an outer coil slot 11 to accommodate outer coil 2 (shown in FIG. 3C). The outer coil slot 11 may be provided at the inner side of outer ring 1. In some embodiments, a cross section of outer coil slot 11 may be a concave and outer coil opening 12 may be provided at the bottom of outer coil slot 11. Outer coil opening 12 may have an exit on one side (e.g. front side as shown in FIG. 3B) that allows outer coil 2 to exit from outer coil slot 11 of outer ring 1. Thus, outer coil 2 can be connected to the other components outside of the magnetic ring (e.g., rangefinder, power supply, data processing and control unit, etc.) of the range-finding system.

Figure 3C:
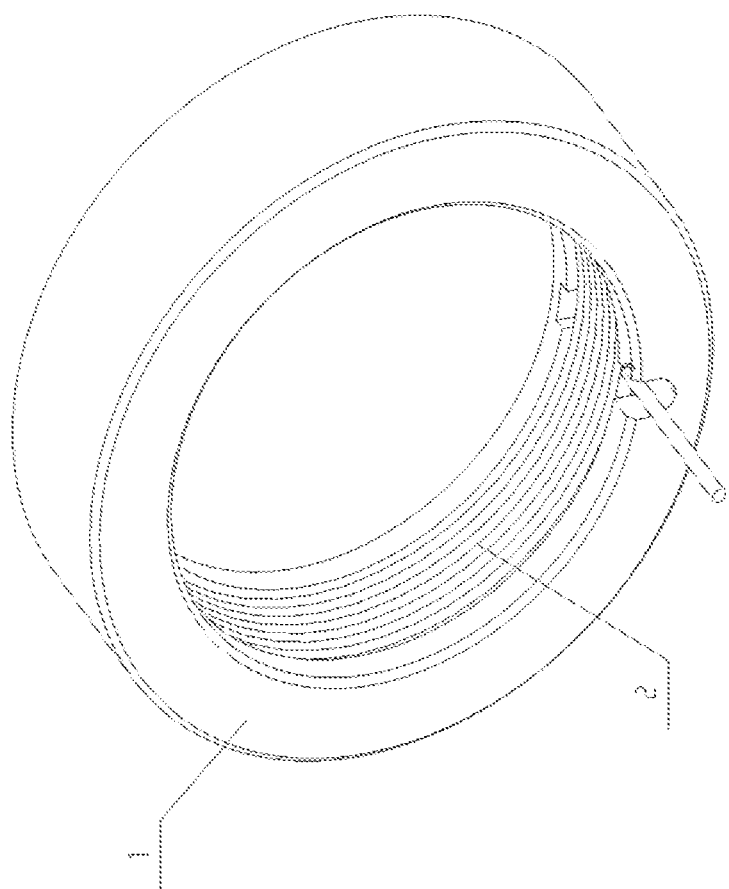
FIG. 3C illustrates another oblique front view of an exemplary outer ring, according to embodiments of the disclosure.

FIG. 3C illustrates another oblique front view of an exemplary outer ring, according to embodiments of the disclosure. Outer ring 1 in FIG. 3C is provided with outer coil 2 in outer coil slot 11 (shown in FIG. 3B) that winds along the inside circumference of outer ring 1. One end of outer coil 2 protrudes from outer coil opening 12 for connection with other components of the range-finding system. Outer coil 2 according to the present disclosure may be configured to transmit data or power. In certain embodiments outer coil 2 may be configured both to transmit data and to transfer power at the same time.

Figure 3D:
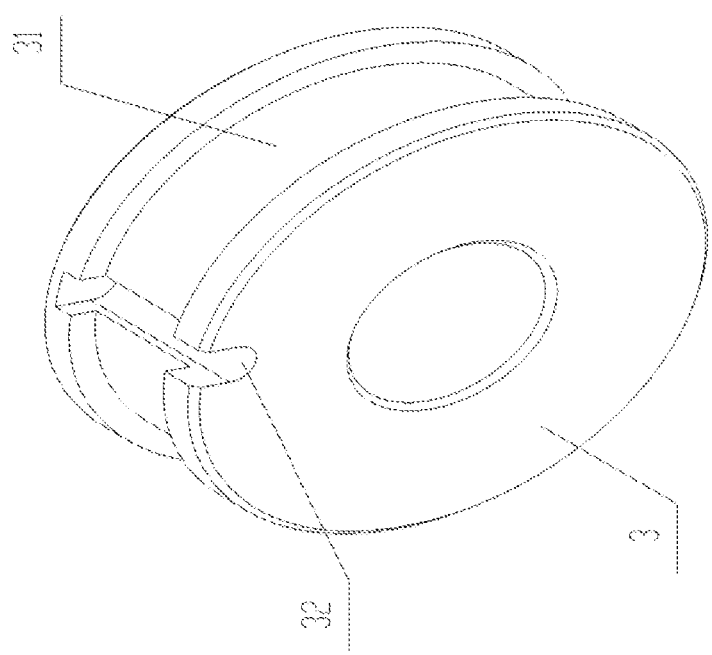
FIG. 3D illustrates an oblique front view of an exemplary inner ring, according to embodiments of the disclosure.

FIG. 3D illustrates an oblique front view of an exemplary inner ring, according to embodiments of the disclosure. Inner ring 3 may include an inner coil slot 31 to accommodate inner coil 4 (shown in FIG. 3E). The inner coil slot 31 may be provided at the outer side of inner ring 3. In some embodiments, a cross section of inner coil slot 31 may be a concave and inner coil opening 32 may be provided at the bottom of inner coil slot 31. The size of inner coil slot 31 may match that of outer coil slot 11. For example, both inner coil slot 31 and outer coil slot 11 may have the same opening size. In some embodiments, inner coil slot 31 and outer coil slot 11 may be disposed facing each other, as illustrated in FIG. 3A. Inner coil opening 32 may have an exit on one side (e.g. front side as shown in FIG. 3D) that allows inner coil 4 to exit from inner coil slot 32 of inner ring 3. Thus, inner coil 4 can be connected to the other components outside of the magnetic ring (e.g., rangefinder, power supply, data processing and control unit, etc.) of the range-finding system.

Figure 3E:
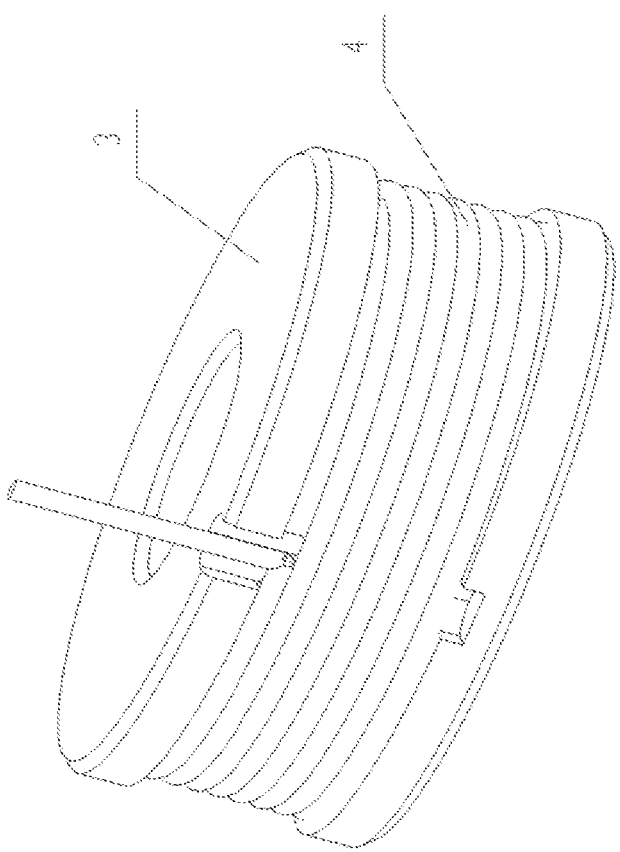
FIG. 3E illustrates a side view of an exemplary inner ring, according to embodiments of the disclosure.

FIG. 3E illustrates a side view of an exemplary inner ring, according to embodiments of the disclosure. Inner ring 3 in FIG. 3E is provided with inner coil 4 in inner coil slot 31 (shown in FIG. 3D) that winds along the outside circumference of inner ring 3. One end of inner coil protrudes from inner coil opening 32 for connection with other components of the range-finding system. Inner coil 4 according to the present disclosure may be configured to transmit data or power.

Consistent with some embodiments according to the present disclosure, outer ring 1 and inner ring 3 may be made from magnetic materials, such as ferrite, cobalt, nickel, any alloy thereof, or the like. These rings may also be known as magnetic cores. In one example, the magnetic cores may be made of Mn—Zn ferrite, such as $Mn_xZn_{(1-x)}Fe_2O_4$, or Ni—Zn ferrite, such as $Ni_xZn_{(1-x)}Fe_2O_4$. Magnetic cores made of Mn—Zn ferrite usually have an operation frequency below 1M Hz. Magnetic cores made of Ni—Zn ferrite usually have an operation frequency of 1M-300M Hz. Magnetic cores according to the present disclosure may choose Ni—Zn ferrite as their materials in order to have an operating frequency of 1M-300M Hz. In another example, the magnetic cores may be doped with impurities in order to fine tune their electromagnetic characteristics. The magnetic cores according to the present disclosure may have high magnetic permeability, high saturation flux density, low coercivity, low power loss, etc. For each magnetic ring, the more coils are wound inside the ring, the more flux it may have. On the other side, higher number of turns of coils may create higher capacitance between the coils, thus affecting the transmission of high frequency components of the data. Thus, magnetic rings according to the present disclosure may be chosen to have an appropriate number of turns of coils to ensure system bandwidth.

Each of outer ring 1 and inner ring 3 may have an integral structure. Both rings can be made from a mold having substantially the same size and contour as each of them. When outer ring 1 and inner ring 3 both have the integral structure and outer coil opening 32 and inner coil opening 12 are on the same side of the magnetic ring, the leakage inductance associated with outer ring 1 and inner ring 3 may be reduced, thus ensuring higher magnetic flux, which in turn enhances the performance of electromagnetic field coupling. Moreover, the size of the cross section of the magnetic ring may also impact its transmission ability. In some embodiments, the size of the cross section may be adjusted to be below a predetermined value.

Figure 4A:
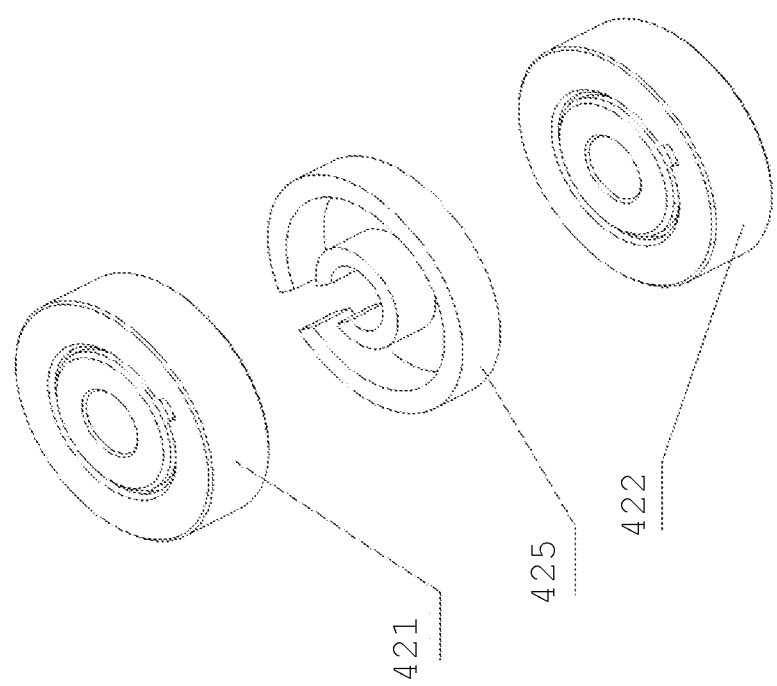
FIG. 4A illustrates an exploded view of an exemplary pair of magnetic rings, according to embodiments of the disclosure.

FIG. 4A illustrates an exploded view of an exemplary pair of magnetic rings, according to embodiments of the disclosure. Magnetic ring 421 may be implemented by the exemplary magnetic ring discussed in FIGS. 3A-3E. Likewise, magnetic ring 422 may also be implemented by the same exemplary magnetic ring. As discussed in more details below, in some embodiments, one of magnetic rings 421, 422 may be used to transmit power while the other may be used to transmit data; in other embodiments, both magnetic rings 421, 422 may be used to transmit data. As shown in FIG. 4A, two magnetic rings 421, 422 may be aligned along the center axis of one of the magnetic rings. One magnetic ring may be disposed above the other magnetic ring within the range-finding system according to the present disclosure. In some embodiments, magnetic rings 421, 422 may be provided with a space in between, thus reducing the interference between the two magnetic rings. On the other side, because a large space of outer ring 1 and inner ring 3 may cause leakage flux, thus affecting the bandwidth of the magnetic ring, the space consistent with the current embodiments may not be too large. A person of skill in the art would know how to strike a balance between less interference and less leakage flux with the teaching of the present disclosure. In other embodiments, a magnetic shield 425 may be provided between magnetic rings 421, 422. Thus, interference between the two magnetic rings may be greatly reduced or even eliminated. Magnetic shield 425 may be made from a material that diverts magnetic flux from the magnetic rings. An example of such a material may be a magnetic material, such as ferrite, cobalt, nickel, any alloy thereof, or the like.

Figure 4B:
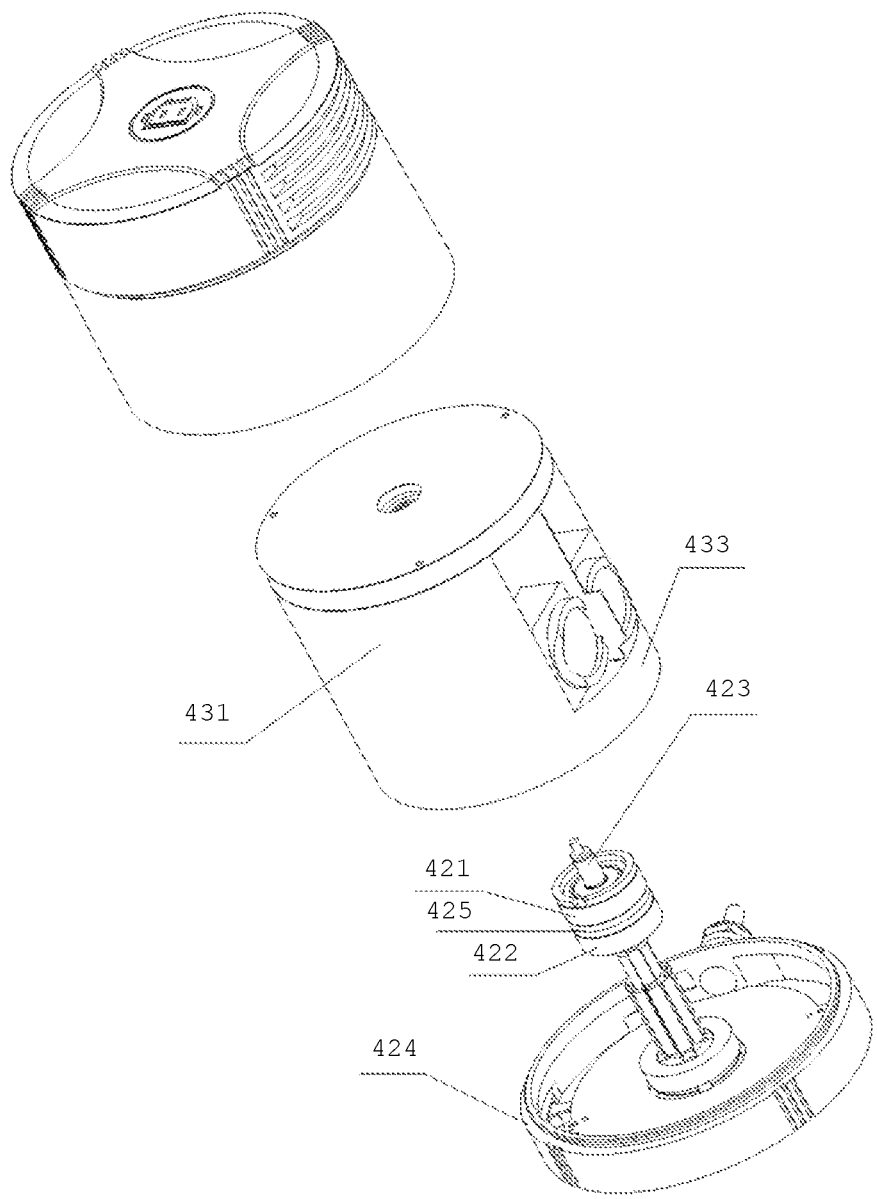
FIG. 4B illustrates an exploded view of an exemplary rotating range-finding system using a pair of magnetic rings, according to embodiments of the disclosure.

FIG. 4B illustrates an exploded view of an exemplary rotating range-finding system 400 using a pair of magnetic rings, according to embodiments of the disclosure. Range-finding system 400 may be used as a range-finding system consistent with the present disclosure. Range-finding system 400 may include a rotating part 431 and a stationary part 424. In some embodiments, inner rings of magnetic rings 421, 422 are connected to stationary part 424 while outer rings of magnetic rings 421, 422 are connected to rotating part 431. Thus, when rotating part 431 starts rotating, relative motion between the outer ring and the inner ring of each of magnetic rings 421, 422 is created, which results in electromagnetic field coupling between the outer coils and the inner coils, thus allowing transmission of one or both of data or power.

Stationary part 424 according to some embodiments of the present disclosure may include a support axle 423. Inner rings of magnetic rings 421, 422 may be fixed to support axle. This prevents the inner rings from being displaced when range-finding system 400 is in operation. Additionally, rotating part 431 may include a rotating body 433. Outer rings of magnetic rings 421, 422 may be fixed to rotating body 433. Thus, the outer rings may rotate at the same angular speed as rotating body 433.

Although FIG. 4B describes an embodiment with two magnetic rings, a person of skill in the art would know that the same teaching could be applied to range-finding systems with any other number of magnetic rings, such as one, three, four, five, or more.

Referring back to FIG. 1, data processing and control unit 110 may receive acquired data transmitted via magnetic ring unit 120. Such data transmitted from rangefinder 130 to other components of range-finding system 100 may be referred to as "downlink data." In some embodiments, it may process the data by converting them into point cloud data, and subsequently reconstruct a 3D representation of the environment being scanned by range-finding system 100. In other embodiments, data processing and control unit 110 may send control data up to rangefinder 130 via magnetic ring unit 120. Such data transmitted from data processing and control unit 110 to other components of range-finding system 100 may be referred to as "uplink data."

In embodiments where only a single magnetic ring is used in the range-finding system, the speed of data transmission is limited by the bandwidth of the communication channel of the magnetic ring unit. The bandwidth may be denoted by bit per second for digital data or hertz (Hz) for analog signals. For the single-magnetic-ring range-finding systems, the transmission speed may be improved by various coding or modulation methods, for example, multilevel data transmission coding, multi-subband frequency division multiplexing, or other similar methods. These methods usually require additional components, such as digital-analog converter, analog-digital converter, data modem, equalizer, etc. These components may add to the complexity and cost of the range-finding system, which may not be ideal in certain implementations. Accordingly, the current disclosure also proposes a range-finding system having multiple magnetic rings constituting multiple communication channels. Thus, multiple channels may coexist or cooperate as the media for data transmission, thus increasing the data transmission speed.

Figure 5:
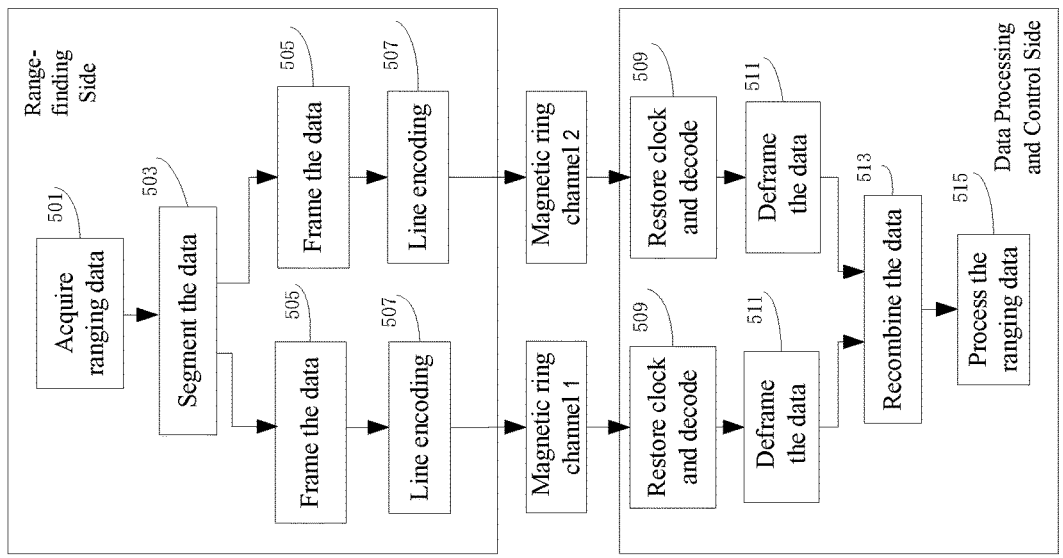
FIG. 5 illustrates a data communication flowchart of the first exemplary range-finding system, according to embodiments of the disclosure.

FIG. 5 illustrates a data communication flowchart 500 of the first exemplary range-finding system 100, according to embodiments of the disclosure. It is noted that the same description and implementation below may also be applied to other range-finding systems having three or more magnetic ring channels. According to the present disclosure, each of magnetic ring channels 1, 2 may be used as a communication channel in the range-finding system. This pair of magnetic ring channels 1, 2 may be implemented by the double-magnetic-ring configuration discussed in conjunction with FIGS. 4A-4B. When data is transmitted via a magnetic ring channel, it may be referred to as "data magnetic ring channel." When power is transmitted via a magnetic ring channel, it may be referred to as "power magnetic ring channel." FIG. 5 is associated with an embodiment where both magnetic ring channels are used for data transmission. When ranging data acquired by a rangefinder of the range-finding system is transmitted to a data processing and control unit as downlink data via the magnetic ring channels, the data transmission speed may be increased because more communication channels are used than embodiments where only one magnetic ring is used.

According to embodiments of the present disclosure, at step 501, ranging data may be acquired on the rangefinder side (that is, transmitting side) of the range-finding system. In some embodiments, the rangefinder may continuously sample ranging data for transmission, such as by a LiDAR Tx/Rx module.

According to embodiments of the present disclosure, to more efficiently transmit ranging data using two or more magnetic ring channels, at step 503, a data segmentation process may be performed based on one or more parameters of the magnetic ring channels, which may be at least partially affected by intrinsic characteristics of each magnetic ring. The intrinsic characteristics may include the material of the magnetic ring, the space between inner and outer rings, the size of the cross section of the magnetic ring, and the number of turns of coils disposed in the magnetic ring. The parameters may include the total bandwidth of the two or more channels combined, the number of channels, the maximum transmission speed of each channel, etc. In particular, the total bandwidth of the two or more channels may be calculated by aggregating the maximum transmission speed of each channel. When the channels are designed to have equivalent parameters of each other, the total bandwidth may be calculated by multiplying the number of channels with the maximum transmission speed of one channel.

In some embodiments, the amount of data being transmitted by each channel during a given period of time may be segmented by multiplying a coefficient to the total amount of data being transmitted by all channels during that period, as demonstrated in the equation below.

$$d_i = \frac{s_i}{\sum_{1}^{N} s_i} D \qquad \text{Eq. (1)}$$

where $d_i$ is the amount of data being transmitted by the $i_{th}$ channel, D is the total amount of data being transmitted by all channels, $s_i$ is the bandwidth for the $i_{th}$ channel, N is the total number of channels. In these embodiments, the coefficient is the bandwidth ratio between that of the $i_{th}$ channel and the total bandwidth. This weighted distribution of segmented data allows ranging data to be transmitted through each of the magnetic rings according to its transmission capacity (e.g., bandwidth), and therefore will not cause overflow of data in some channels that have smaller bandwidths.

In other embodiments, segmentation may be performed at step 503 under different rules. For example, a sequential segmentation may be carried out. The first half of a frame may be separated from its second half, and the two halves may be distributed to two different channels. In another example, an interval sampling may be used to extract a number of sub-frames which equates to the number of channels, and may subsequently be distributed to different channels for transmission. Another example adopts frame skipping, which randomly samples the ranging data and performs segmentation based on skipping rules and preset data structure. The preset data structure may be a weighted distribution of segmented data discussed above. With the teaching of the present disclosure, a person of ordinary skill in the art would know that there are various segmentation methods applicable to step 503. Some are based on time-division, while others are based on predetermined sampling methods. As long as the segmentation methods may improve the transmission efficiency or robustness, they may be implemented in the range-finding system. In the present embodiment of the range-finding system that includes two magnetic ring channels, the acquired ranging data may be segmented into two parts of data according to the parameters of each channel and predetermined segmentation rules, and then may be transmitted via magnetic ring channel 1 and magnetic ring channel 2.

Thanks to the complexity of the real world, the amount of data acquired by the rangefinder may vary significantly. For example, in a complex environment, a massive amount of data may be acquired; in a simple environment or an environment with few changes, only a small amount of data may be acquired. Thus, according to some embodiments consistent with the present disclosure, the data segmentation may be performed based on various factors prior to transmission, such as the amount of data acquired by the rangefinder, number of magnetic ring channels, maximum transmission speed of each channel, etc. In an example of three magnetic ring channels, when the amount of data is relatively small, the data processing and control unit may control the rangefinder to use only one magnetic ring channel to transmit the downlink data. This has the benefit of saving energy of the system. When the amount of data is relatively large, the data processing and control unit may control the rangefinder to use two or three magnetic ring channels to transmit the downlink data. When one of the three magnetic ring channels has a maximum transmission speed of 512 Kbps and two other magnetic ring channels have a maximum transmission speed of 256 Kbps each, the data processing and control unit may control all three channels to transmit the downlink data at a maximum transmission speed of 256 Kbps. This equal distribution of ranging data into three channels is the simplest way to perform data segmentation at step 503.

In some embodiments, the number of communication channels may be more than sufficient to accommodate the relatively small amount of data being transmitted, and therefore to fully utilize the channel resource, the rangefinder may determine the number of magnetic ring channels according to a preset transmission speed requirement and the maximum transmission speed of each channel. For example, the rangefinder may select a subset of all magnetic ring channels for data transmission so that each selected channel may be operated at its maximum or close-to-maximum transmission speed. In some embodiments, when not all channels are used, it is preferable to select nonadjacent channels in order to minimize the cross-channel interference.

Prior to the segmentation, a check code may be inserted into the ranging data to improve robustness and reduce probability of error during transmission. With the inserted check code, the transmitted data may be checked upon receipt.

According to embodiments of the present disclosure, at steps 505, the segmented data may be framed in the range-finding system. In some embodiments, steps 505 may be carried out on the range-finding side. Each step 505 may be configured to frame the data according to a preset data transmission protocol. One of the data framing structure according to the present disclosure is disclosed below.

| Sync Bit | Frame Number | Data Payload | Check Bit |
|---|---|---|---|

The sync bit may be used to synchronize the data on the receiving side of the transmission, so that data may be distinguished from noise. The frame number may be used to recognize the position of the received frame, so that the receiver can restore the accurate data with reference to the frame number. The data payload may contain the data being transmitted. The check bit may be used to check the data received by the receiver in order to determine whether the data is accurately received. Examples of check methods include CRC check or other suitable check methods.

According to embodiments of the present disclosure, at steps 507, line encoding may be performed in the range-finding system. In some embodiments, steps 507 may be carried out on the range-finding side. To ensure accuracy of the transmitted data, each channel may encode the data prior to transmission. A person of skill in the art would know how to choose appropriate coding methods to encode the data. Simpler encoding methods may be used to reduce the amount of processing needed for the system. To reduce cross-channel interference, different magnetic ring channels may be physically separated, such as by magnetic shield 425 discussed in conjunction with FIGS. 4A-4B. Additionally, different coding methods may be applied to different channels to reduce cross-channel interference. Less interference indicates higher reliability and accuracy of data transmission. After line encoding, the encoded downlink data may be transmitted to the data processing and control side (i.e., the receiving side) via magnetic ring channels 1, 2.

According to embodiments of the present disclosure, at steps 509, clock may be restored and ranging data may be decoded in the range-finding system. In some embodiments, steps 509 may be carried out on the data processing and control side. With reference to the processing steps on the rangefinder side, the data processing and control side performs mirroring steps to process the received data. For example, after receiving the downlink data respectively form magnetic rings 1, 2, at steps 509, decoding of each downlink data in view of the coding methods used at steps 507 may be carried out. The coding methods may be communicated to steps 509 from steps 507 via magnetic ring channels or from other sources (such as a memory of the system). The decoding of the received data may further include a synchronization step using the sync bit contained in the data. After decoding, the downlink data may be restored.

According to embodiments of the present disclosure, at steps 511, the decoded data may be deframed in the range-finding system. In some embodiments, steps 511 may be performed on the data processing and control side. In accordance with the data framing structure adopted on the rangefinder side, the following may be performed at steps 511: synchronize the frame, extract the check bit, and check the received data frame. Once the check is completed, the data may be sent to the next steps for recombination.

According to embodiments of the present disclosure, at step 513, the received data may be recombined in the range-finding system. In some embodiments, step 513 may be carried out on the data processing and control side. On the data processing and control side, the frame number of the received data frame may be extracted, thus recombining data according to the extracted frame number. As a result, the original data information contained in the ranging data may be restored.

According to embodiments of the present disclosure, at step 515, the ranging data may be processed in the range-finding system. In some embodiments, step 515 may be carried out on the data processing and control side. The ranging data may be processed and analyzed for subsequent steps, such as reconstruction of a 3D map.

The range-finding system according to the present disclosure includes two or more communication channels, each of which employs a magnetic ring. This configuration improves the transmission speed of ranging data and greatly enhances data transmission efficiency. Moreover, the range-finding system may select appropriate magnetic ring channel(s) for data transmission according to the amount of ranging data being transmitted and/or the transmission speed required, thus increasing the usage rate of the channels. Furthermore, the selection may be self-adaptive, thus dispensing with the need of human operation.

It is understood that the various steps 501, 503, 505, 507, 509, 511, 513, 515 described in conjunction with FIG. 5 may be implemented by a single device or a component inside the range-finding system, or separate devices or components with dedicated functions. In either case, the steps may be carried out by one or more processors of the range-finding system. Each processor may include any appropriate type of general-purpose or special-purpose microprocessor, digital signal processor, or microcontroller. Each processor may be configured as a separate processor module dedicated to carry out at least one step. Alternatively, each processor may be configured as a shared processor module for performing other functions unrelated to those described above associated with FIG. 5.

Figure 6A:
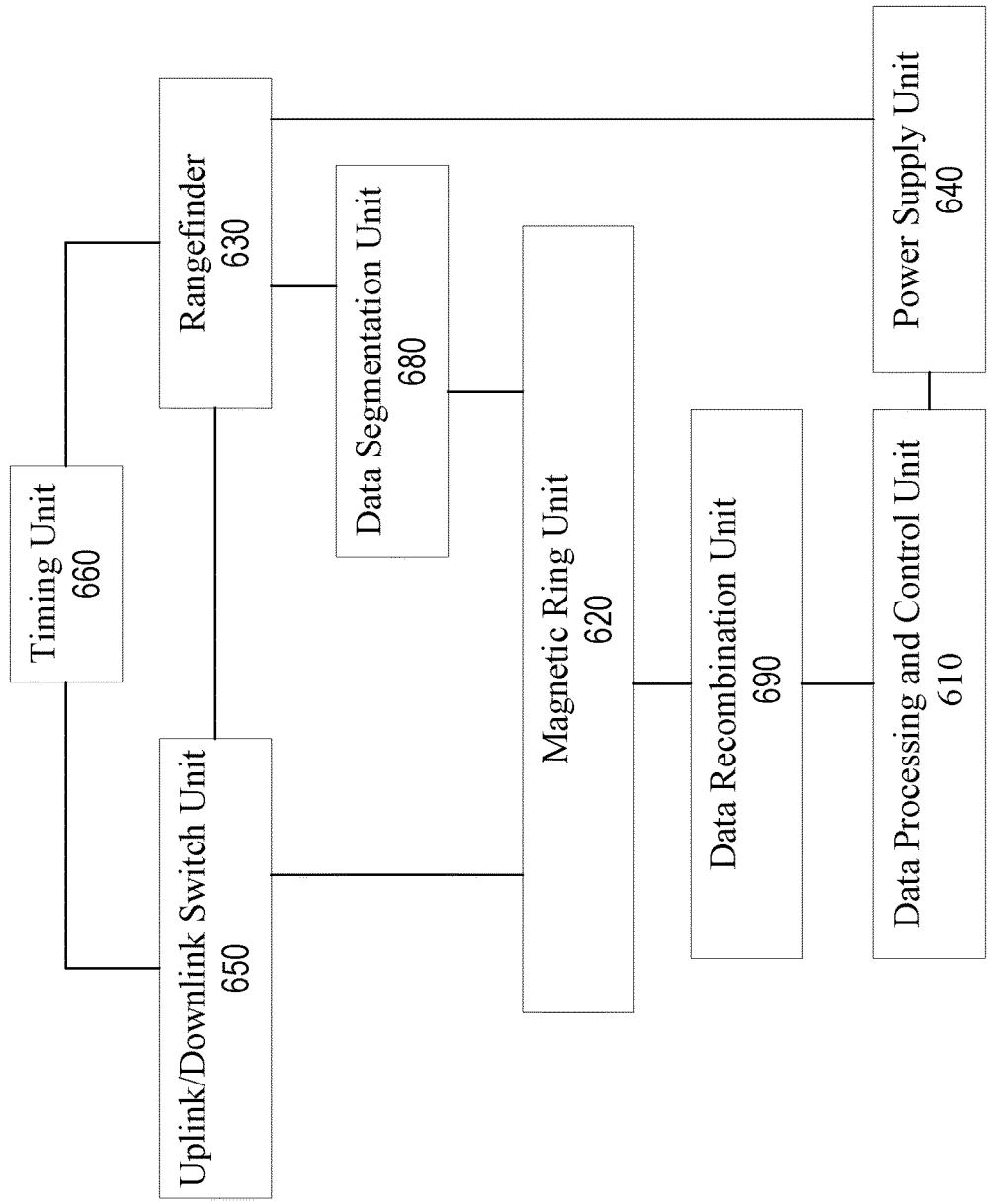
FIG. 6A illustrates a block diagram of a second exemplary range-finding system, according to embodiments of the disclosure.

FIG. 6A illustrates a block diagram of a second exemplary range-finding system 600, according to embodiments of the disclosure. Range-finding system 600 is capable of transmitting both downlink data and uplink data. In some embodiments, although rangefinder acquires ranging data and transmit downlink data most of the time, it sometimes may also have to receive uplink data, such as a control signal, from the data processing and control unit. For example, the control signal may update the software of the rangefinder, or may adjust the parameters of the detection and ranging of the rangefinder. Range-finding system 600 according to the present disclosure may not need manual software update via a plug-in flash drive or a cable, which is much less efficient.

As shown in FIG. 6A, in addition to data processing and control unit 610, magnetic ring unit 620, and rangefinder 630, range-finding system 600 may further include a power supply unit 640, which may supply power to rangefinder 630 under the control of data processing and control unit 610. When data processing and control unit 610 receives a control signal, it may reboot power supply unit 640. Upon being notified of the success reboot of power supply unit 640 by another signal, data processing and control unit 610 may send the control signal to magnetic ring unit 620 in order to initiate the switch between uplink/downlink data transmission. In an example, downlink data transmission may be switched to uplink data transmission. In another example, uplink data transmission may be switched to downlink data transmission. It is noted that, in other embodiments, switch between uplink and downlink data transmission may not require a reboot of power supply unit 640. An example is when the switch is carried out by temporarily stopping downlink transmission with a stop signal from the processor of range-finding system 600.

Range-finding system 600 according to the present disclosure may further include an uplink/downlink switch unit 650 and a timing unit 660. In some embodiments, when power supply unit 640 is rebooted, uplink/downlink switch unit 650 may suspend the transmission of downlink data by magnetic ring unit 620, and perform uplink data monitor. When uplink data transmission is detected, uplink/downlink switch unit 650 may instruct magnetic ring unit 620 to receive uplink data. Timing unit 660 may be coupled to uplink/downlink switch unit 650. The term "coupled to" used herein means connected electrically, which does not necessarily require physical contact. When power supply unit 640 is rebooted, timing unit 660 starts to time the uplink data monitor by uplink/downlink switch unit 650.

In some embodiments, when rangefinder 630 completes receipt of uplink data via magnetic ring unit 620, it may send a signal to timing unit 660 to stop timing of uplink data monitor, and the timing unit 660 may stop accordingly and notify uplink/downlink switch unit 650 to reboot the transmission of downlink data by magnetic ring unit 620. Moreover, uplink/downlink switch unit 650 may determine whether rangefinder 630 receives the uplink data. If, after a predetermined duration, no signal indicating that rangefinder 630 has received uplink data is received by timing unit 660, timing unit 660 may send an uplink data receipt failure signal to data processing and control unit 610.

Optionally, data processing and control unit 610 may control uplink/downlink switch unit 650 to switch back to downlink data transmission, and also determine the cause of the receipt failure. After the cause is determined, data processing and control unit 610 may continue to transmit uplink data according to preset rules. One exemplary preset rule may be that if it is determined that magnetic ring unit 620 has not received the uplink data and the predetermined duration has reached, data processing and control unit 610 may execute corresponding processing, for example, sending a signal to uplink/downlink switch unit 650 to restart timing unit 660, thus causing magnetic ring unit 620 to switch to a status of receiving the uplink data again. The predetermined duration may be a Fibonacci sequence, for example, 1 min, 1 min, 2 min, 3 min, . . . , F(n), where $F(n)=F(n-1)+F(n-2)$ $(n \geq 3, n \in N^*)$. In some embodiments, the predetermined duration may be shorter, such as a few seconds or even lower, while in other embodiments it may be longer. It is understood that when the predetermined duration or the total duration has exceeded a threshold value, a channel error warning may be notified, and the mode of transmission may be switched back to downlink data transmission. Another exemplary preset rule is based on the times of restarting timing unit 660 to re-initiate uplink data transmission after a previous receipt failure. If the uplink data is successfully transmitted within a predetermined number of times, the uplink data transmission may be switched to downlink data transmission. If the uplink data cannot be transmitted within a predetermined number of times, a warning message may be generated.

In other embodiments, the switch from uplink to downlink data transmission may not be triggered by any of the above scenarios. Rather, the switch may simply be triggered by a predetermined duration, regardless whether the uplink data is received or not.

In some embodiments, when a signal indicating that the receipt of uplink data has not been completed after a predetermined duration, uplink/downlink switch unit 650 may send a delay request, which may information such as the amount of data already received, data processing and control unit 610 may redefine the duration of timing unit 660 according to the amount of data already received in order to allow continued receipt of uplink data. Once uplink data receipt is finished, uplink/downlink switch unit 650 may restart the transmission of downlink data.

In other embodiments, when a signal indicating that the receipt of uplink data has not been completed after a predetermined duration, uplink/downlink switch unit 650 may send information about the amount of data already transmitted to data processing and control unit 610, and rangefinder 630 may save the already transmitted data. Meanwhile, data processing and control unit 610 may initiate downlink data transmission according to preset rules, and rearrange a time for resuming the transmission of the uplink data. When such time comes, data processing and control unit 610 may continue transmission of the rest of the uplink data.

Through the various embodiments discussed above, one may understand that the status of uplink data transmission may be effectively managed by timing unit 660. Data processing and control unit 610 may control the switch of sending/receipt of the uplink data and the downlink data by rebooting power supply unit 640, thus achieving duplex communication of magnetic ring unit 620. As a result, magnetic ring unit 620 may transmit ranging data as downlink data while also transmitting uplink data, which simplifies configuration of the system and improves its ease of use.

According to the present disclosure, range-finding system 600 may further include a data segmentation unit 680. Prior to the transmission of the downlink data, data segmentation unit 680 may acquire parameters of magnetic ring unit 620. It may also receive the downlink data (e.g., ranging data), and segment the downlink data based on the acquired parameters. Data segmentation unit 680 may further distribute the segmented downlink data to two or more communication channels of magnetic ring unit 620 for transmission. In some embodiments of the present disclosure, data segmentation unit 680 in range-finding system 600 may be the same as that used at step 503 shown in FIG. 5.

According to the present disclosure, range-finding system 600 may further include a data recombination unit 690. Data recombination unit 690 may receive the segmented downlink data (e.g., ranging data) from two or more of the communication channels of magnetic ring unit 620, and recombine the segmented downlink data. The recombined downlink data may be transmitted to data processing and control unit 610. In some embodiments of the present disclosure, data recombination unit 690 in range-finding system 600 may be the same as that used at step 513 shown in FIG. 5.

According to the present disclosure, power supply unit 640 in FIG. 6A may be designed to have a compact size, high conversion rate, large power output, and excellent reliability. In some embodiments, power supply unit 640 may use a magnetic ring that transmits power through electromagnetic coupling. When the range-finding system incorporating power supply unit 640 rotates and one of the coils wound along the inner ring and the outer ring of the magnetic ring is provided with current, the magnetic fields of the inner ring and the out ring may interact with each other to create current on the other coil of the magnetic ring, thus transmitting electric power to components coupled to the other coil. In some embodiments, the inner ring and the outer ring of the magnetic ring of power supply unit 640 may differ in size, such as those discussed in conjunction with FIGS. 3A-3E.

Figure 6B:
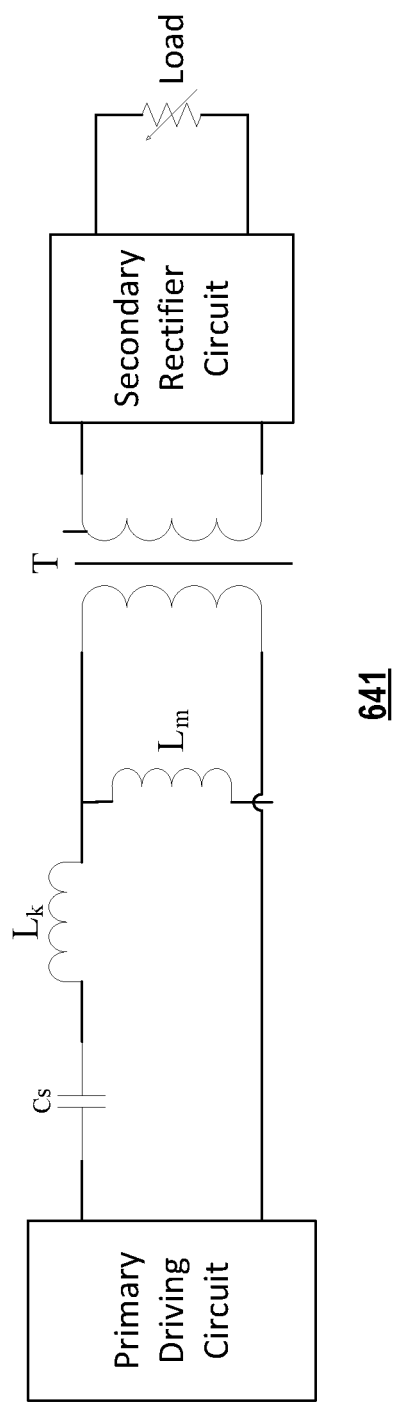
FIG. 6B illustrates a block diagram of the equivalent circuit of an exemplary power supply unit, according to embodiments of the disclosure.

FIG. 6B illustrates a block diagram of the equivalent circuit of an exemplary power supply unit 641, according to embodiments of the disclosure. When in operation, the inner ring and the outer ring may effectively be viewed as a transformer (T) with leakage inductance ($L_k$) and magnetizing inductance ($L_m$) for the purpose of circuit analysis. One of the inner and outer rings may be viewed as a primary driving circuit, and the other as a secondary rectifier circuit. A load may be coupled to the secondary rectifier circuit. The load may be the equivalent load of all circuits on the rotating part of the range-finding system. The primary driving circuit may be a half-bridge driving circuit or a full-bridge driving circuit. The secondary rectifier circuit may be a half-bridge rectifier circuit or a full-bridge rectifier circuit.

Due to the existence of $L_k$, when the current passing through the primary driving circuit increases, the driving voltage diverted to $L_k$ also increases, and consequently the voltage applied to the primary side of the transformer decreases. Leakage inductance $L_k$ may further cause a voltage spike when the primary driving circuit switches its operation mode, thus creating large electromagnetic interference (EMI).

According to the present disclosure, a resonant capacitance ($C_s$) is provided in the primary driving circuit. Thus, $C_s$ may be adjusted so that it may form a resonance circuit with $L_k$ when the equivalent frequency of the serially coupled $L_k$ and $C_s$ is equal to the operating frequency of the primary driving circuit ($f_s$), which may be demonstrated by the following equation:

$$f_s = \frac{1}{2\pi\sqrt{L_k \cdot C_s}} \quad \text{Eq. (2)}$$

In such a resonance circuit, none of the voltage is diverted to either $L_k$ or $C_s$, and the power output to the secondary rectifier circuit can be significantly improved. As a result, power loss may be eliminated and transmission efficiency may be enhanced. Moreover, EMI may also be reduced. One application of the embodiments associated with FIG. 6B may be found in resonance unit 1162, which will be discussed in conjunction with FIG. 11A below.

Figure 7:
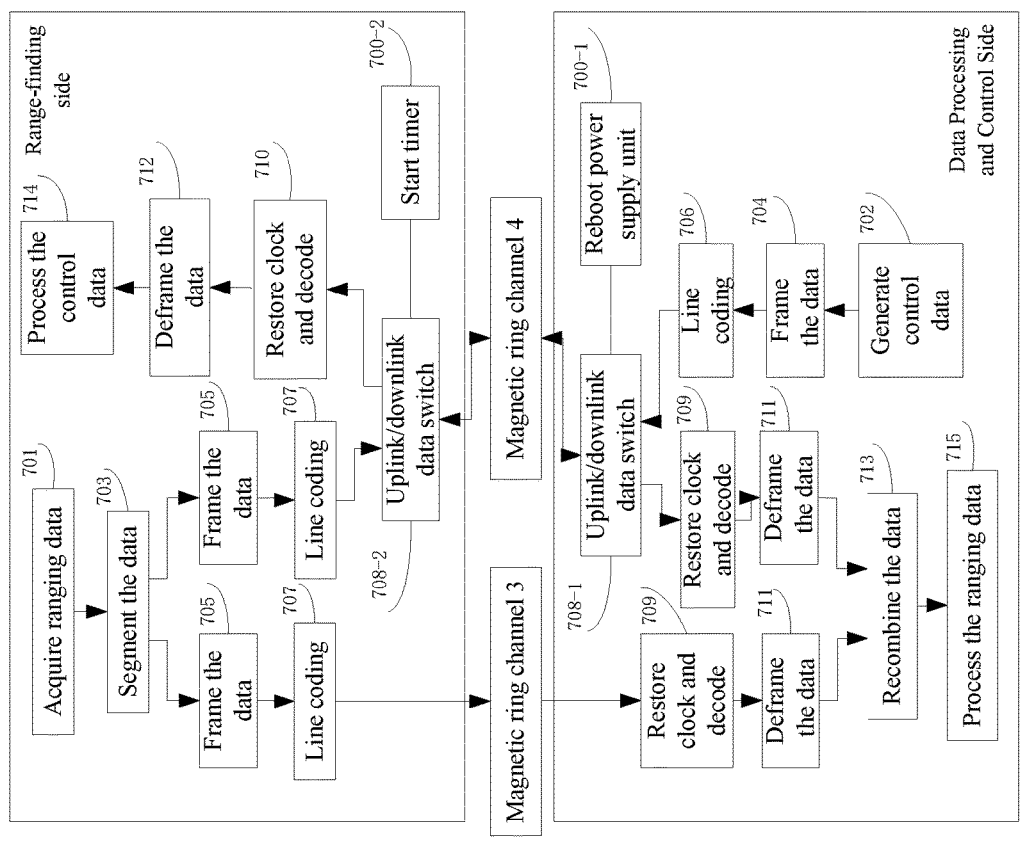
FIG. 7 illustrates a data communication flowchart of the second exemplary range-finding system, according to embodiments of the disclosure.

FIG. 7 illustrates a data communication flowchart 700 of the second exemplary range-finding system 600, according to embodiments of the disclosure. It is noted that the same description and implementation below may also be applied to other range-finding systems having three or more magnetic ring channels. According to the present disclosure, each of magnetic ring channels 3, 4 may be used as a communication channel in the range-finding system. This pair of magnetic ring channels 3, 4 may be implemented by the double-magnetic-ring configuration discussed in conjunction with FIGS. 4A-4B. FIG. 7 is associated with an embodiment where one magnetic ring channel is used for data transmission, and another magnetic ring channel is used for both data and power transmission.

Steps 701, 703, 705, 707, 709, 711, 713, 715 in FIG. 7 may be the same as those corresponding steps 501, 503, 505, 507, 509, 511, 513, 515 in FIG. 5, and thus will not be repeated herein. The following description will be focused on uplink data transmission.

According to the present disclosure, control data may be generated at step 702. In some embodiments, step 706 may be carried out on the data processing and control side. When the range-finding system has uplink data to be transmitted, such as a software update request to the rangefinder, the data processing and control unit may be notified. When the data processing and control unit is notified, it controls reboot of the power supply unit, as at step 700-1, which in turn causes reboot of the rangefinder. Upon reboot of the rangefinder, a timer is started, as at step 700-2, and a switch between the uplink data transmission and downlink data transmission is triggered, as at step 708-1 or step 708-2. In this particular embodiment, a switch from the status of sending ranging data to the status of receiving uplink data is performed. Therefore, the data processing and control unit is able to notify the rangefinder, via reboot of the power supply unit, to receive the uplink data in a new and simple manner.

According to the present disclosure, the generated control data may be framed according to a predetermined data transmission protocol at step 704. In some embodiments, step 706 may be carried out on the data processing and control side. In some embodiments, the range-finding system may choose one communication channel that uses a magnetic ring for transmitting the uplink data. Thus, data segmentation may not be needed, and the data may be directly framed. There are several existing methods of framing. For example, one of them associated with the current embodiments is listed below.

| Sync Bit | Data Payload | Check Bit |
|---|---|---|

The sync bit may be used to synchronize the data on the receiving side of the transmission, so that data may be distinguished from noise. The data payload may contain the data being transmitted. The check bit may be used to check the data received by the receiver in order to determine whether the data is accurately received. Examples of check methods include CRC check or other suitable check methods.

According to the present disclosure, line coding may be performed on the received data at step 706. In some embodiments, step 706 may be carried out on the data processing and control side. To ensure accuracy of the transmitted data, each channel may encode the data prior to transmission. A person of skill in the art would know how to choose appropriate coding methods to encode the data. Simpler encoding methods may be used to reduce the amount of processing needed for the system. To reduce cross-channel interference, different magnetic ring channels may be physically separated, such as by magnetic shield 425 discussed in conjunction with FIGS. 4A-4B. Additionally, different coding methods may be applied to different channels to reduce cross-channel interference. Less interference indicates higher reliability and accuracy of data transmission.

According to the present disclosure, switch of uplink and downlink transmission may be performed at step 708-1. In some embodiments, step 708-1 may be carried out on the data processing and control side. At this step 708-1, the data processing and control unit no longer receives ranging data from the rangefinder; rather, the data processing and control unit controls the magnetic ring unit to use one of magnetic ring unit's channels to transmit uplink data. Correspondingly, on the range-finding side (that is, uplink data receiving side) and prior to receipt of the uplink data by the rangefinder, the rangefinder may start the timer at step 700-2 when power supply to the rangefinder is rebooted. The uplink/downlink data switch unit may also switch the data sending mode to the data receiving mode at step 708-2. In some embodiments, step 708-2 may be carried out on the range-finding side. Before the timer reaches a predetermined duration of time, the rangefinder remains in the status of receiving the uplink data and the uplink/downlink data switch unit also remains in the uplink receiving status.

According to the present disclosure, at step 710, the rangefinder may restore the clock and decode the uplink data sent from the data processing and control side via one of the magnetic ring channels. In some embodiments, step 710 may be carried out on the range-finding side. Opposite to the processing of the transmitted data on the data processing and control side, the range-finding side may process the received data in a reverse manner. For example, when the rangefinder receives the uplink data via magnetic ring channel 4, it may synchronize the received frame, start decoding, and restore the data.

According to the present disclosure, the uplink data may be deframed at step 712. In some embodiments, step 712 may be carried out on the range-finding side. In accordance with the data framing structure adopted on the data processing and control side, the following may be performed at step 712: synchronize the frame, extract the check bit, and check the received data frame. Once the check is completed, the data may be sent to the next steps for recombination.

According to the present disclosure, the uplink data may be processed at step 714. In some embodiments, step 714 may be carried out on the range-finding side. In the embodiments associated with FIG. 7, the uplink data may be a control data generated at step 702 on the data processing and control side and transmitted all the way through steps 704, 706, 708, 710, 712, and 714 as uplink data. The uplink data may be processed and analyzed by the rangefinder for subsequent steps, such as updating the software of the range-finding system.

The settings of the timer may be preset. In some embodiments, the timer may time the clock according to the transmission status of the uplink data. When the clock runs out, the rangefinder may stop receiving the uplink data and change back to the range-finding mode to transmit downlink data. In other embodiments, when the timer reaches a predetermined duration, the uplink/downlink data switch unit determines whether the magnetic ring channel successfully receives uplink data. If not, a receipt failure signal may be sent to the data processing and control unit. By this means, the data processing and control unit may know the transmission result of the uplink data, and carry out further processing accordingly. For example, one of the further processing may be reinitiating the uplink data transmission. If the uplink/downlink data switch unit determines that the uplink data transmission is successful, a transmission success signal may be sent to the data processing and control unit.

When it is determined the magnetic ring channel does not receive the uplink data, and the timer has reached a predetermined duration, the data processing and control unit may execute corresponding processing according to preset rules. For example, it may send a signal to the uplink/downlink switch unit to restart the timing unit, thus causing the magnetic ring channel to switch to a status of receiving the uplink data again. The predetermined duration may be a Fibonacci sequence, for example, 1 min, 1 min, 2 min, 3 min, ..., F(n), where $F(n)=F(n-1)+F(n-2)$ $(n \geq 3, n \in N^*)$. In some embodiments, the predetermined duration may be shorter, such as a few seconds or even lower, while in other embodiments it may be longer. It is understood that when the predetermined duration or the total duration has exceeded a threshold value, a channel error warning may be notified, and the mode of transmission may be switched back to downlink data transmission. Another exemplary preset rule is based on the times of restarting timing unit 660 to re-initiate uplink data transmission after a previous receipt failure. If the uplink data is successfully transmitted within a predetermined number of times, the uplink data transmission may be switched to downlink data transmission. If the uplink data cannot be transmitted within a predetermined number of times, a warning message may be generated.

The range-finding system according to the present disclosure may share one communication channel for both uplink and downlink transmission. This makes it easy to transmit uplink data, improves system performance, simplifies system configuration, and enhances efficiency of the system.

Figure 8:
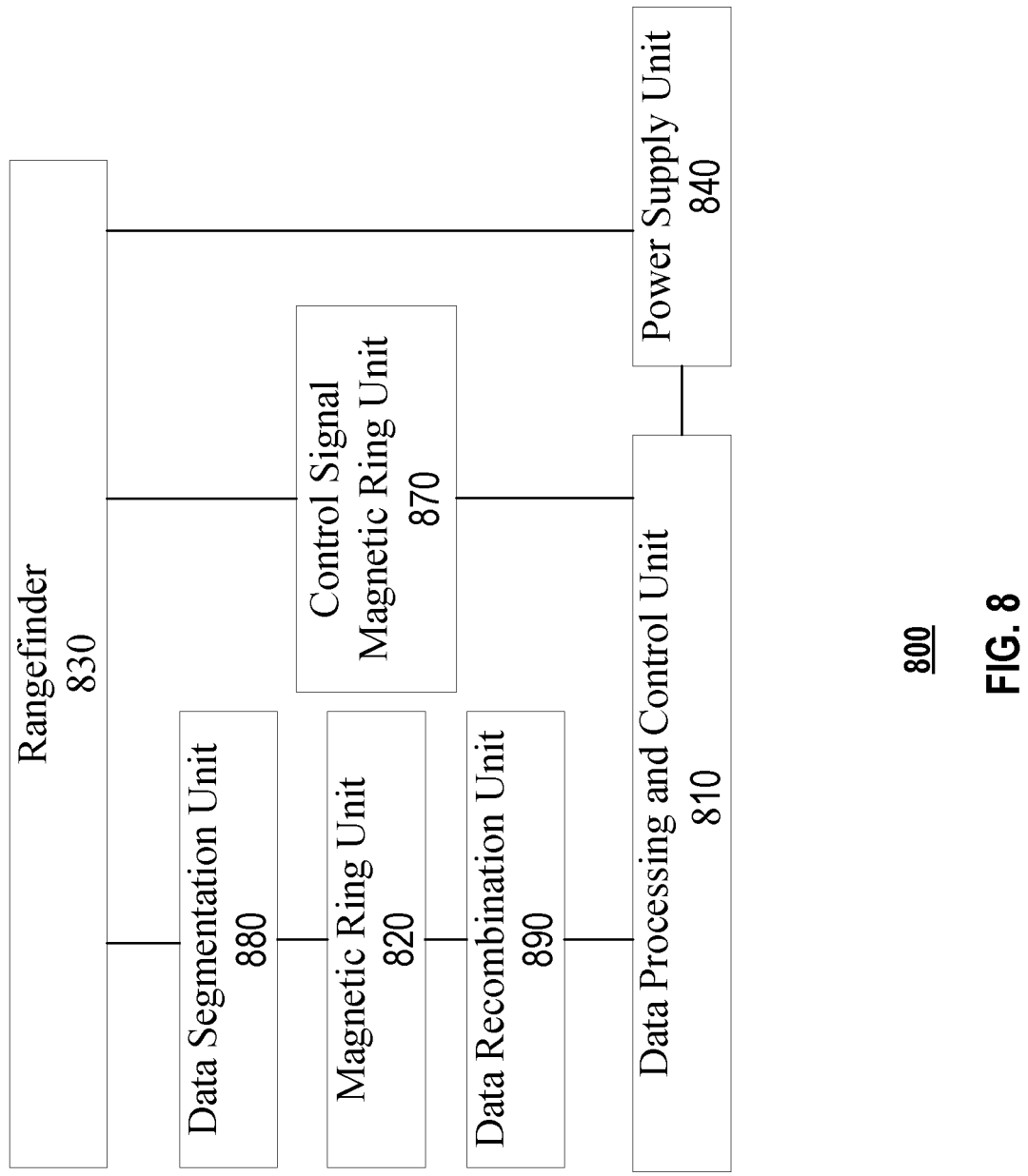
FIG. 8 illustrates a block diagram of a third exemplary range-finding system, according to embodiments of the disclosure.

FIG. 8 illustrates a block diagram of a third exemplary range-finding system 800, according to embodiments of the disclosure. Range-finding system 800 may include a rangefinder 830, a magnetic ring unit 820, a data processing and control unit 810, a power supply unit 840, and a control signal magnetic ring unit 870.

In some embodiments, rangefinder 830 may transmit acquired ranging data as downlink data to magnetic ring unit 820, and receive uplink data transmitted from data processing and control unit 810 via magnetic ring unit 820. Magnetic ring unit 820 may include at least two communication channels, each of which may include a magnetic ring. Each magnetic ring may be implemented by the exemplary magnetic ring discussed in FIGS. 3A-3E. Magnetic ring unit 820 may transmit downlink data to data processing and control unit 810. Data processing and control unit 810 may receive and process the downlink data (e.g., ranging data from rangefinder 830). In other embodiments, data processing and control unit 810 may control magnetic ring unit 820 to receive and process the downlink data. It may further control magnetic ring unit 820 to transmit uplink data to rangefinder 810. Power supply unit 840 may supply power to rangefinder 830 under the control of data processing and control unit 810. In some embodiments, power supply unit 840 may comprise a power channel for transmitting power from data processing and control unit 810 to rangefinder 830. The power channel may comprise a magnetic ring implemented by the exemplary magnetic ring discussed in FIGS. 3A-3E.

Consistent with the embodiments according to the present disclosure, control signal magnetic ring unit 870 may include one control channel, which may include a magnetic ring. The magnetic ring may be implemented by the exemplary magnetic ring discussed in FIGS. 3A-3E. Control signal magnetic ring unit 870 may transmit the uplink data sent from data processing and control unit 810 to rangefinder 830.

Besides at least two communication channels using magnetic rings, range-finding system 800 according to the present disclosure may be further provided with an independent control signal magnetic ring unit 870 as a control channel specifically dedicated to the transmission of uplink data to rangefinder 830. Thus, this dedicated communication channel makes it more convenient to transmit uplink data than range-finding system 600, because it can transmit uplink data at any time without interrupting the operation of the rangefinder in the range-finding system.

Range-finding system 800 may further include a data segmentation unit 880 and a data recombination unit 890. The functions of these two units are similar to those of data segmentation unit 680 and data recombination unit 690, and thus will not be further described herein.

Figure 9:
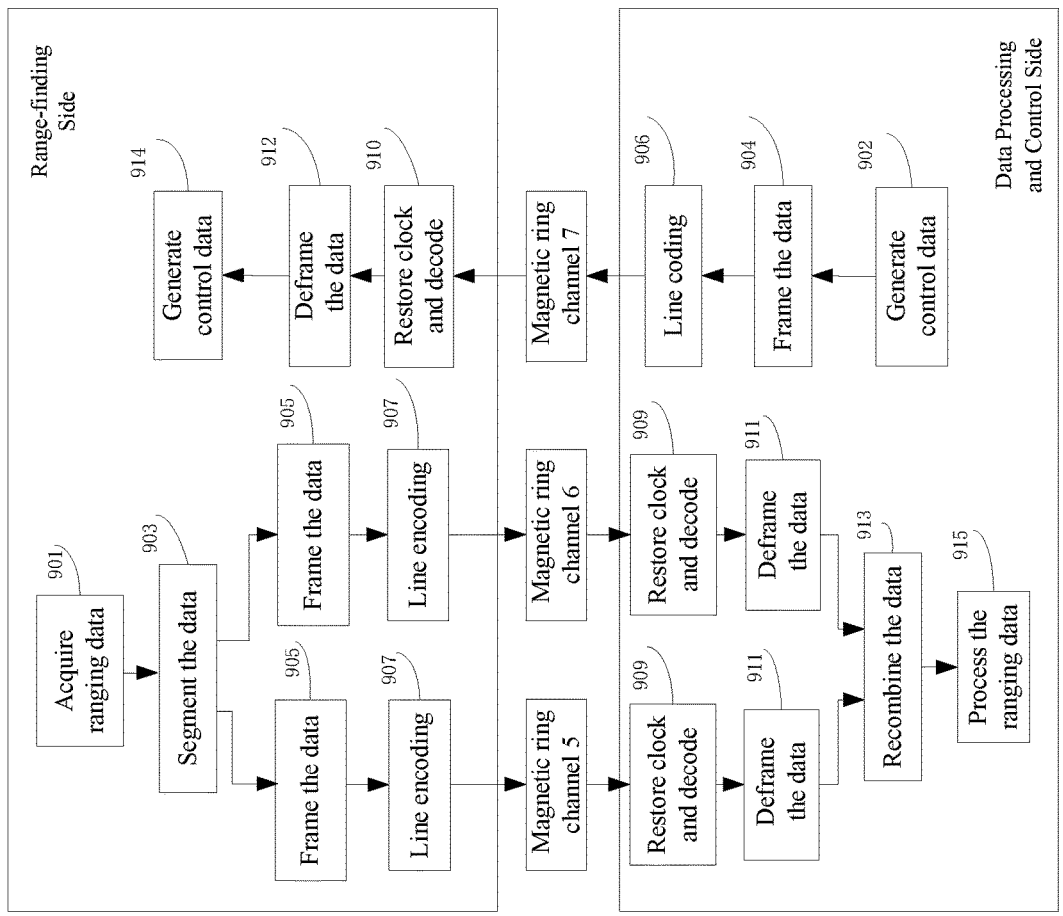
FIG. 9 illustrates a data communication flowchart of the third exemplary range-finding system, according to embodiments of the disclosure.

FIG. 9 illustrates a data communication flowchart 900 of the third exemplary range-finding system 800, according to embodiments of the disclosure. Range-finding system 800 includes at least three magnetic ring channels 5, 6, 7. In the embodiments associated with FIG. 9, two channels 5, 6 may be used to transmit downlink data (e.g., ranging data) while one magnetic ring channel 7 may be used to transmit uplink data (e.g., control signals). Magnetic ring channel 7 may be referred to as a "control channel."

Steps 901, 903, 905, 907, 909, 911, 913, 915 in FIG. 9 may be the same as those corresponding steps 501, 503, 505, 507, 509, 511, 513, 515 in FIG. 5, and thus will not be repeated herein. Moreover, steps 902, 904, 906, 908, 910, 912, 914 in FIG. 9 may be the same as those corresponding steps 702, 704, 706, 708, 710, 712, 714 in FIG. 7, and thus will not be repeated herein. Compared to first range-finding system 100 and second range-finding system 600, range-finding system 800 transmits uplink data and downlink data in separate communication channels, thus reducing interference and increasing transmission efficiency. To further reduce cross-channel interference, different magnetic ring channels may be physically separated, such as by magnetic shield 425 discussed in conjunction with FIGS. 4A-4B.

Consistent with the embodiments according to the present disclosure, power supply units in each of the exemplary range-finding systems 100, 600, 800 may be a wireless power supply unit, which provides power through electromagnetic induction. Alternatively, power supply units may provide power by power magnetic rings, which transmits power to the rangefinder through voltages created between the inner and outer rings. In such an embodiment, one may use a power magnetic ring unit. The power magnetic ring unit may include a channel that further includes a magnetic ring. The power magnetic ring unit may transmit power to the rangefinder under the control of the data processing and control unit.

Embodiments according to the present disclosure provide a range-finding system. The range-finding system is capable of data transmission. The range-finding system includes at least two communication channels, each of which includes a magnetic ring. Such a configuration improves the transmission speed of ranging data, and allows a massive amount of data to be transmitted from the rangefinder to the data processing and control unit. An example of a real-world application is a multi-beam LiDAR system. The existence of an uplink/downlink switch unit and a rebootable power supply unit may permit sharing of one magnetic ring channel for bi-directional data transmission (e.g., uplink and downlink). Thus, the channel may be fully utilized and the system configuration may be simplified. The addition of a magnetic ring channel dedicated to transmitting uplink data improves the communication efficiency of the range-finding system with respect to both transmission directions (e.g., uplink and downlink). Thus, the uplink data transmission is independent from the downlink data transmission, and as a result the system controllability and data transmission efficiency may further be enhanced.

Figure 10:
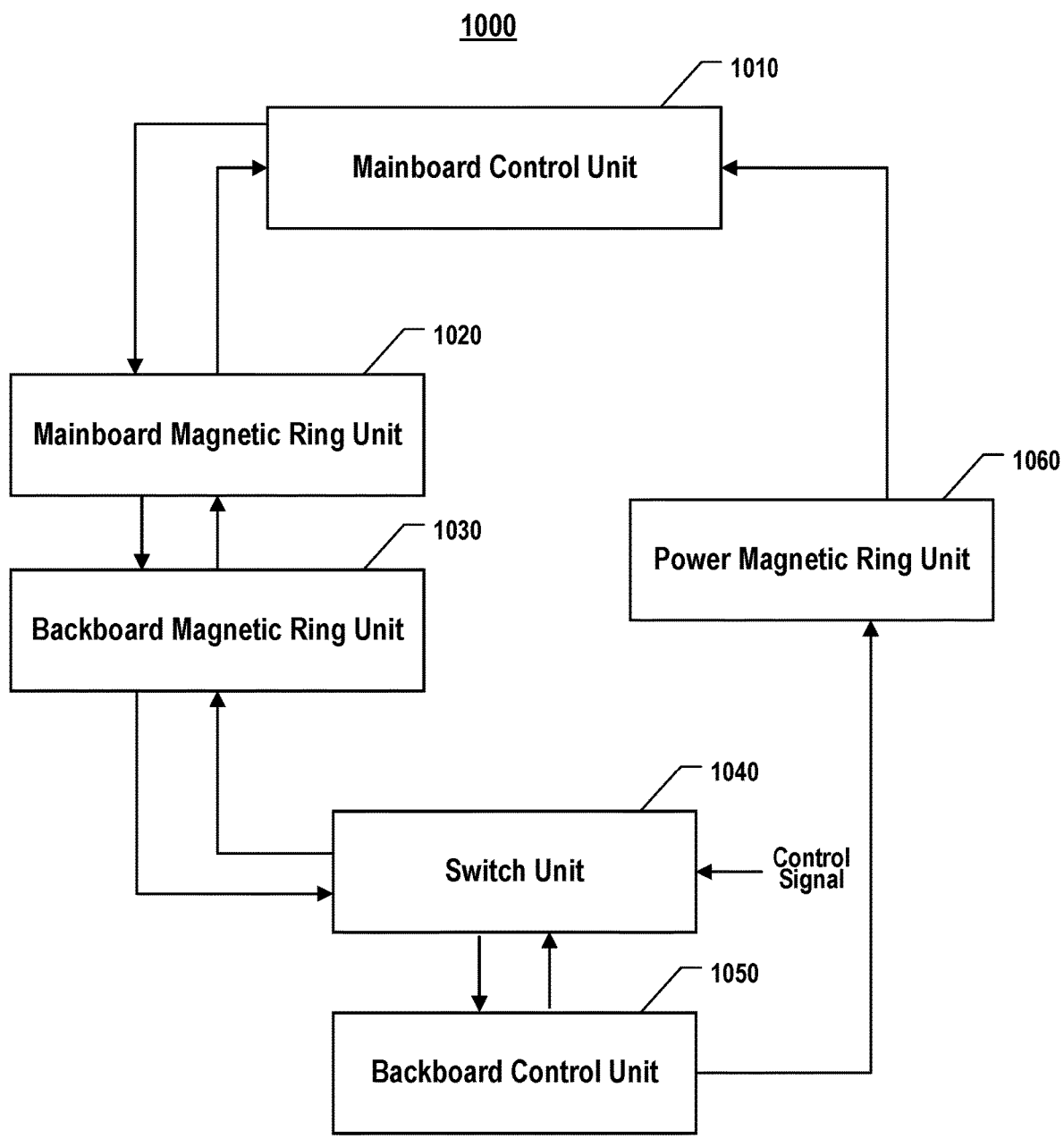
FIG. 10 illustrates a block diagram of a fourth exemplary range-finding system, according to embodiments of the disclosure.

FIG. 10 illustrates a block diagram of a magnetic-ring-based communication system 1000, according to embodiments of the disclosure. Communication system 1000 may be used to transmit data or power between two different parts of a system. The two parts may belong to communication system 1000 itself, or another system, such as a range-finding system as described herein. Communication system 1000 may use two channels for transmission, with one communication channel for data transmission and one power channel for power transmission. The communication channel may have duplex communication ability. For example, it may transmit both downlink data and uplink data by time division, which means the transmission is one direction at any given time. If more than one magnetic ring is provided in the communication channel, downlink data and uplink data may be simultaneously transmitted.

As illustrated in FIG. 10, communication system 1000 may include a mainboard control unit 1010, a mainboard magnetic ring unit 1020, a backboard magnetic ring unit 1030, a switch unit 1040, a backboard control unit 1050, and a power magnetic ring unit 1060. Switch unit 1040 may have similar functions as uplink/downlink switch unit 650 described in conjunction with FIG. 6A. Switch unit 1040 may receive a downlink control signal and an uplink control signal. When it receives the downlink control signal, switch unit 1040 may switch to downlink transmission status, and mainboard control unit 1010 transmits downlink data to backboard control unit 1050 via the communication channel, which includes a mainboard magnetic ring unit 1020 and a backboard magnetic ring unit 1030. When it receives the uplink control signal, switch unit 1040 may switch to uplink transmission status, and backboard control unit 1050 transmits uplink data to mainboard control unit 1010 via the communication channel.

In some embodiments, mainboard control unit 1010 may be a standalone part of communication system 1000. Mainboard control unit 1010 may generate various types of downlink data by itself, such as imagery data, voice data, temperature data, etc. It is understood that other components may be mounted on mainboard control unit 1010 to assist the generation of the downlink data, such as an image sensor, a microphone, a thermometer, etc. In other embodiments, mainboard control unit 1010 may be a part of another system, such as a range-finding system. Mainboard control unit 1010 may receive data from a different part of that system, such as a LiDAR transmission and receiving module. Thus, mainboard control unit 1010 may function as a relay that forward those data as downlink data to the communication channel.

In some embodiments, backboard control unit 1050 may be a standalone part of communication system 1000. Backboard control unit 1050 may receive and process various types of downlink data by itself, such as imagery data, voice data, temperature data, etc. It is understood that other components may be mounted on backboard control unit 1050 to assist the processing of the downlink data, such as one or more general-purpose processors or one or more specifically designed processors. In other embodiments, backboard control unit 1050 may be a part of another system, such as a range-finding system. Backboard control unit 1050 may forward the received downlink data to a different part of that system, such as a data processing and control unit. Thus, backboard control unit 1050 may function as a relay that receives and forwards downlink data transmitted from the communication channel. In other embodiments, backboard control unit 1050 may generate or forward uplink data to mainboard control unit 1010 via the communication channel. Such uplink data may include control signal, firmware update request, etc. In further embodiments, backboard control unit 1050 may send at least one of uplink control signal or downlink control signal to switch unit 1040.

According to some embodiments of the present disclosure, in a normal operation, mainboard control unit 1010 transmits downlink data to backboard control unit 1050. If a firmware update is needed, backboard control unit 1050 may send an uplink control signal to switch unit 1040, thus starting uplink data transmission for firmware update. When the update is complete, backboard control unit 1050 sends a downlink control signal to switch 1050, thus changing uplink data transmission back to downlink data transmission. In some other embodiments, the uplink control signal or the downlink control signal may be transmitted from another unit or component of communication system 1000. As shown in FIG. 10, data and power transmission is represented by solid lines, while control signal transmission is represented by dotted lines.

Mainboard magnetic ring unit 1020 according to the current disclosure may be implemented by an inner ring (such as inner ring 3 in FIG. 3A-3E) or an outer ring (such as outer ring 1 of FIGS. 3A-3E) of a magnetic ring. In some embodiments, mainboard magnetic ring unit 1020 may receive the downlink data from mainboard control unit 1010 and transmit them to backboard magnetic ring unit 1030. Backboard magnetic ring unit 1030 according to the current disclosure may be implemented by an outer ring (such as outer ring 1 in FIG. 3A-3E) or an inner ring (such as inner ring 3 of FIGS. 3A-3E) of a magnetic ring. If one of mainboard magnetic ring unit 1020 and backboard magnetic ring unit 1030 is an inner ring, the other may be an outer ring so that the two rings may form a complete and functional magnetic ring. After receiving the downlink data from mainboard magnetic ring unit 1010, backboard magnetic ring unit 1030 may transmit the same to switch unit 1040. Switch unit 1040 may or may not transmit downlink data to backboard control unit 1050, depending on which status it is in.

In some embodiments, power magnetic ring unit 1060 may transmit power supplied from backboard control unit 1060 to mainboard control unit 1010. Power magnetic ring unit 1060 may comprise a mainboard power magnetic ring unit and a backboard power magnetic ring unit (not shown).

According to the present disclosure, the duplex transmission of uplink and downlink data and the supply of power may be carried out simultaneously or sequentially. When carried out simultaneously, the communication system may become more efficient in operation. When one or more magnetic rings described in conjunction with FIGS. 3A-3E and 4A-4B are used, the communication system may have a longer lifespan and more robustness.

Figure 11A:
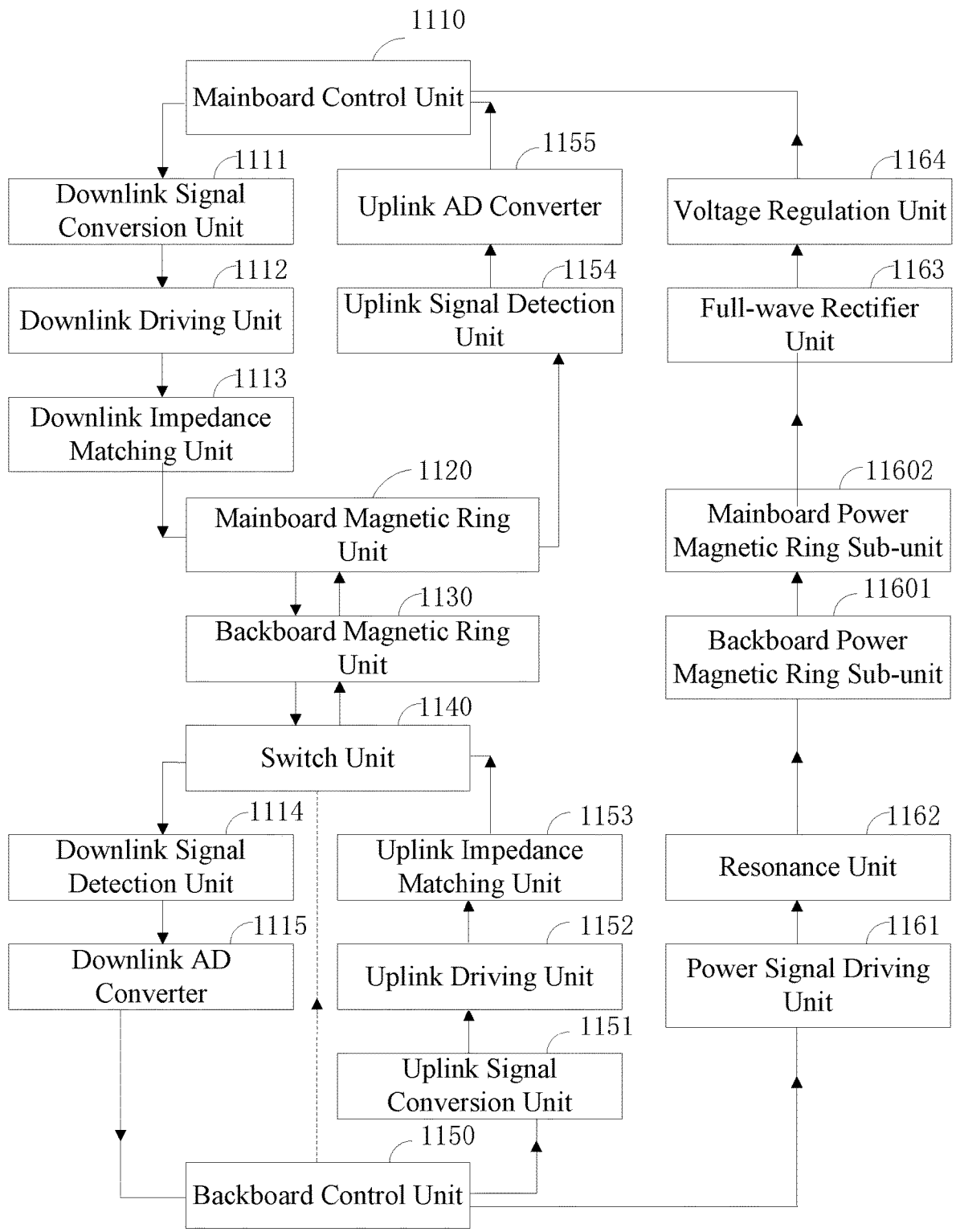
FIG. 11A illustrates a detailed block diagram of a magnetic-ring-based communication system, according to embodiments of the disclosure.

FIG. 11A illustrates a detailed block diagram of a magnetic-ring-based communication system 1100, according to embodiments of the disclosure. In some embodiments, communication system 1100 may include a downlink signal conversion unit 1111. It may receive downlink data transmitted from a mainboard control unit 1110 and convert it into a downlink differential signal. Communication system 1100 may also include a downlink driving unit 1112. It may receive the downlink differential signal and amplify it to obtain an amplified downlink differential signal. An example of downlink driving unit 1112 may be an amplifier. Communication system 1100 may also include a downlink impedance matching unit 1113. It may receive the amplified downlink differential signal, match impedance of the amplified downlink differential signal, and output a downlink analog signal.

Subsequently, mainboard magnetic ring unit 1120 may receive the downlink analog signal and convert it into electromagnetic energy. Then backboard magnetic ring unit 1130 may convert the electromagnetic energy into downlink analog signal. Such a transmission of downlink data may be wireless, meaning that there is no physical contact between mainboard magnetic ring unit 1120 and backboard magnetic ring unit 1130. Thus, abrasion between the two parts can be eliminated, thereby increasing the lifespan of the magnetic ring while also achieving high speed of rotation.

In some embodiments, communication system 1100 may include a downlink signal detection unit 1114 and a downlink analog-to-digital (AD) converter 1115. Downlink signal detection unit 1114 may receive the downlink analog signal from backboard magnetic ring unit 1130 when switch unit 1140 is in the downlink transmission status. It may further filter the downlink analog signal. An example of downlink signal detection unit 1114 may be a low-pass filter. Downlink AD converter 1115 may receive the downlink analog signal and convert it into downlink data. The downlink data may be output to backboard control unit 1150 for further processing.

In some embodiments, communication system 1100 may include an uplink signal conversion unit 1151. It may receive uplink data transmitted from back control unit 1150 and convert it into an uplink differential signal. Communication system 1100 may also include an uplink driving unit 1152. It may receive the uplink differential signal and amplify it to obtain an amplified uplink differential signal. An example of uplink driving unit 1112 may be an amplifier. Communication system 1100 may also include an uplink impedance matching unit 1153. It may receive the amplified uplink differential signal, match impedance of the amplified uplink differential signal, and output an uplink analog signal.

Subsequently, backboard magnetic ring unit 1130 may receive the uplink analog signal and convert it into electromagnetic energy. Then mainboard magnetic ring unit 1120 may convert the electromagnetic energy into uplink analog signal. Such a transmission of uplink data may be wireless as well, the benefit of which will not be repeated herein.

In some embodiments, communication system 1100 may include an uplink signal detection unit 1154 and an uplink AD converter 1155. Uplink signal detection unit 1154 may receive the uplink analog signal from mainboard magnetic ring unit 1120 when switch unit 1140 is in the uplink transmission status. It may further filter the uplink analog signal. An example of uplink signal detection unit 1154 may be a low-pass filter. Uplink AD converter 1155 may receive the uplink analog signal and convert it into uplink data. The uplink data may be output to main control unit 1110 for further processing.

Consistent with some embodiments according to the present disclosure, one or more of mainboard control unit 1110, downlink signal conversion unit 1111, downlink driving unit 1112, downlink impedance matching unit 1113, mainboard magnetic ring unit 1120, uplink signal detection unit 1154, or uplink AD converter 1155 may be provided on a mainboard. Similarly, one or more of backboard control unit 1150, uplink signal conversion unit 1151, uplink driving unit 1152, uplink impedance matching unit 1153, mainboard magnetic ring unit 1130, downlink signal detection unit 1114, or downlink AD converter 1115 may be provided on a backboard.

According to the present disclosure, communication system 1100 may include a power signal driving unit 1161. It may receive a power signal from backboard control unit 1150 and amplify the power signal. Communication system 1100 may also include a resonance unit 1162. It may receive the amplified power signal, and convert it into a resonant signal to be transmitted to a power channel, which includes a backboard power magnetic ring sub-unit 11601 and a mainboard power magnetic ring sub-unit 11602. Each of backboard power magnetic ring sub-unit 11601 and mainboard power magnetic ring sub-unit 11602 according to the current disclosure may be implemented by an outer ring (such as outer ring 1 in FIG. 3A-3E) or an inner ring (such as inner ring 3 of FIGS. 3A-3E) of a magnetic ring. If one of backboard power magnetic ring sub-unit 11601 and mainboard power magnetic ring sub-unit 11602 is an inner ring, the other may be an outer ring so that the two rings may form a complete and functional magnetic ring.

Subsequently, backboard power magnetic ring sub-unit 11602 may receive the resonant signal and convert it into electromagnetic energy. Then mainboard power magnetic ring sub-unit 11601 may convert the electromagnetic energy into an AC power signal. Such a transmission of power may be wireless as well, the benefit of which will not be repeated herein.

In some embodiments, communication system 1100 may further include a full-wave rectifier unit 1163. It may receive the AC power signal from mainboard power magnetic ring sub-unit 11602 of the power channel, and convert it into a DC power signal. Communication system 1100 may further include a voltage regulation unit 1164. It may receive the DC power signal from full-wave rectifier unit 1163, and regulate it to be output to mainboard control unit 1110.

To further reduce cross-channel interference, the communication channel and the power channel may be physically separated, such as by magnetic shield 425 discussed in conjunction with FIGS. 4A-4B.

Figure 11B:
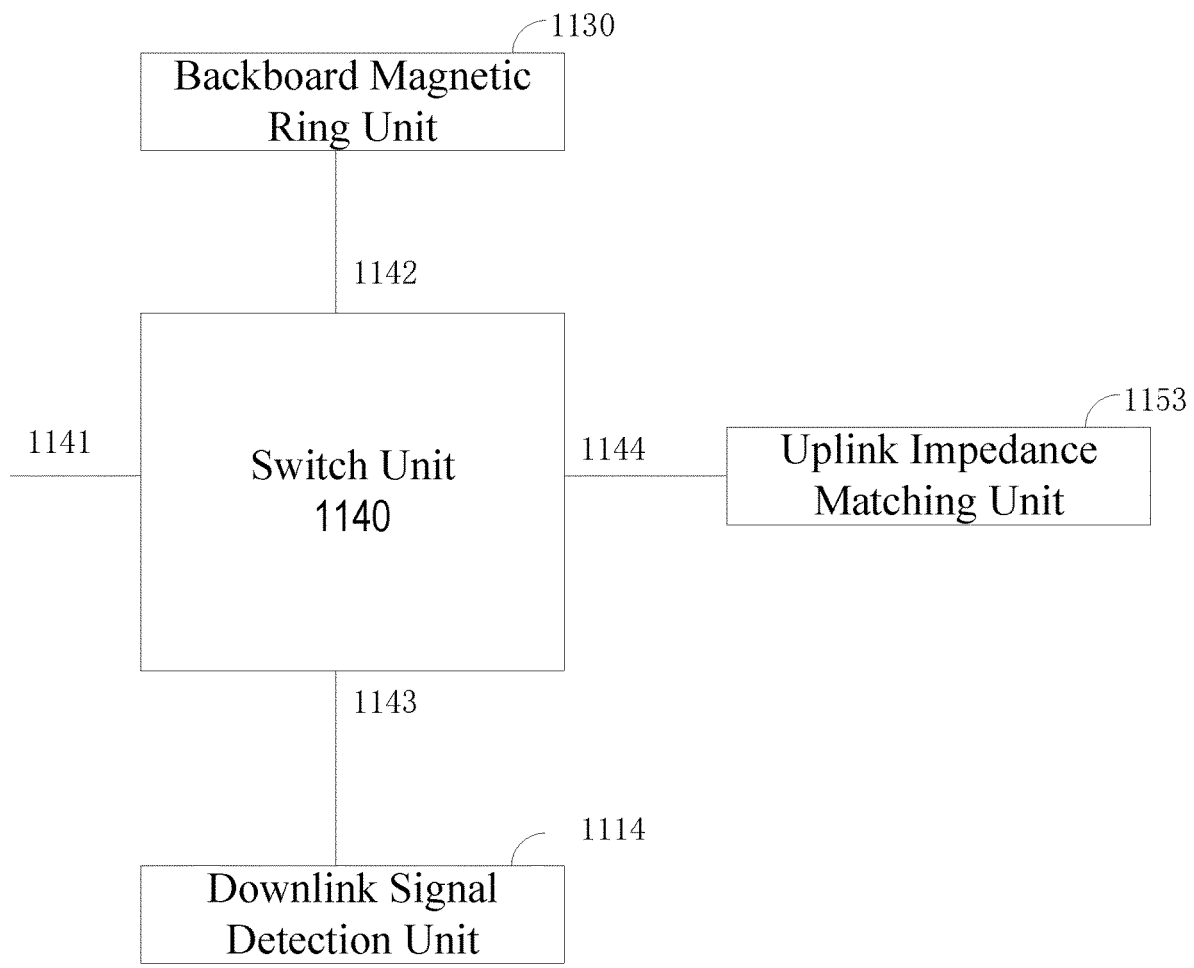
FIG. 11B illustrates a block diagram of a switch unit of the magnetic-ring-based communication system in FIG. 11A, according to embodiments of the disclosure.

FIG. 11B illustrates a block diagram of switch unit 1140 of the magnetic-ring-based communication system 1100, according to embodiments of the disclosure. In some embodiments, switch unit 1140 may include a control port 1141. It may receive at least one of the uplink control signal or the downlink control signal. If there are other types of control signals, control port 1141 may also be the inlet of these signals for switch unit 1140. Switch unit 1140 may also include a magnetic ring port 1142, which is coupled to backboard magnetic ring unit 1130. This allows switch unit to transmit data to or from backboard magnetic ring unit 1130. Switch unit 1140 may further include a downlink conduction port 1143, which is coupled to downlink signal detection unit 1114. This allows switch unit 1140 to take in a downlink analog signal filtered by downlink signal detection unit 1114. Switch unit 1140 may further include an uplink conduction port 1144, which is coupled to uplink impedance matching unit 1153. This allows switch unit 1140 to take in an uplink analog signal.

According to the present disclosure, when switch unit 1140 is turned to a downlink status by a downlink control signal input from control port 1141, uplink conduction port 1144 may be shut down. Thus, the downlink signal may pass through backboard magnetic ring port 1142 and downlink conduction port 1143 to reach downlink signal detection unit 1114. In other words, backboard magnetic ring port 1142 and downlink conduction port 1143 may be coupled together. In contrast, when switch unit 1140 is turned to an uplink status by an uplink control signal input from control port 1141, downlink conduction port 1143 may be shut down. Thus, the uplink signal may pass through uplink impedance matching unit 1153 and uplink conduction port 1143 to reach backboard magnetic ring unit 1130. In other words, uplink impedance matching unit 1153 and backboard magnetic ring unit 113 may be coupled together.

In other embodiments according to the present disclosure, the switch unit of the magnetic-ring-based communication system may be provided at a different location from switch unit 140 in FIG. 10. For example, the switch unit may be provided between the mainboard control unit and the mainboard magnetic ring unit. The functions of the switch unit in these embodiments may be the same as switch unit 1040, except the ports of the switch unit may be designed differently. In this example, the control port may remain at the same location as that of switch unit 1040. The mainboard control unit may replace the backboard control unit to send at least one of the downlink control signal or the uplink control signal to the switch unit. The magnetic ring port may be coupled to the mainboard magnetic ring unit. The downlink conduction port may be coupled to the downlink impedance matching unit. The uplink conduction port may be coupled to the uplink signal detection unit. In these embodiments, when the switch unit is in a downlink status, the uplink conduction port may be shut down, and the downlink signal may pass through the magnetic ring port and the downlink conduction port. When the switch unit is in an uplink status, the downlink conduction part may be shut down, and the uplink signal may pass through the magnetic ring port and the uplink conduction port. Such a configuration and location of the switch unit may be implemented in the embodiments associated with FIG. 9. More specifically, the switch unit may be coupled to magnetic ring channel 7 in FIG. 9, and when it changes uplink transmission mode to downlink transmission mode, all three magnetic ring channels 5, 6, 7 in FIG. 9 may start transmitting downlink data, thus temporarily increasing the bandwidth of the range-finding system 900. Therefore, the switch unit according to these embodiments may add more flexibility to the downlink data transmission of a range-finding system that uses a separate channel to transmit uplink data.

FIG. 12 illustrates a method for data transmission within a range-finding system, according to embodiments of the disclosure. It is to be appreciated that some of the steps may be optional to perform the disclosure provided herein, and that some steps may be inserted in the flowchart of the method that are consistent with other embodiments according to the current disclosure. Further, some of the steps may be performed simultaneously, or in an order different from that shown in FIG. 12. It is further understood that the components used in performing the method may be implemented by any of the similar or same components described above in more details. The same rationales discussed in this paragraph also apply to FIGS. 13 and 14 to be discussed below.

As shown in FIG. 12, a method 1200 may include, at step 1202, acquiring, by a rangefinder, ranging data. An example of a rangefinder is shown as LiDAR Tx/Rx Module 230 in FIG. 2, although any other rangefinder is permitted, as discussed above. The ranging data acquired by the rangefinder may be, for example, acquired data 222 as illustrated in FIG. 2. The process of, at step 1202, acquiring the ranging data may include transmitting by a transmitter (for example, transmitter 202 in FIG. 2) and receiving a reflected signal (for example, return beam 211 in FIG. 2) at a receiver (for example, receiver 204 in FIG. 2). At step 1202, the acquiring can also include performing signal processing using, for example, signal processor 220 in FIG. 2.

Method 1200 may also include, at step 1204, transmitting, via a magnetic ring unit including one or more communication channels, the ranging data as downlink data from the rangefinder to a data processing and control unit. Method 1200 may further include receiving the ranging data at a data processing and control unit. Examples of this process are illustrated in FIGS. 5, 7, and 9.

In some embodiments, when, at step 1204, the transmission uses two or more communication channels, the transmitting can include segmenting the downlink data (see, for example, segment the data 503 in FIG. 5), framing the downlink data (see, for example, frame the data 505 in FIG. 5), line encoding the downlink data (see, for example, line encoding 507 in FIG. 5), and distributing the segmented downlink data to the two or more communication channels. The segmenting may be based on one or more parameters of the two or more communication channels. After transmitting through the magnetic ring unit, method 1200 may further include recombining the segmented downlink data. Thereafter the recombined downlink data may be transmitted to the data processing and control unit.

Each communication channel can be provided by a magnetic ring. An example of a magnetic ring is shown in FIG. 3A. FIG. 4B illustrates how two magnetic rings may be provided in an exemplary assembly. When transmitting the ranging data, the magnetic ring unit may use one or more of the communication channels. Other implementations are also possible and are permitted.

In a further embodiment, method 1200 can include, at step 1206, receiving the downlink data at a data processing and control unit. The received data may be used for further processing at the data processing and control unit or subsequent components of the range-finding system. Subsequently, the data processing and control unit may provide the downlink data to a further system such as, for example, a navigation or guidance system.

FIG. 13 illustrates a further method for data transmission within a range-finding system, according to embodiments of the disclosure. As shown in FIG. 13, a method 1300 may include, at step 1302, acquiring, by a data processing and control unit, control data. The system implementing this method may, for example, be the same system configured to implement method 1200. Moreover, a further example of method 1300 may be illustrated in the uplink path of FIG. 11A, including, for example, uplink signal conversion unit 1151.

The method 1300 may also include, at step 1304, transmitting, via a magnetic ring unit including a communication channel, control data as uplink data to a rangefinder from the data processing and control unit. In a system embodying method 1200, a further step of switching between downlink and uplink transmission modes for the magnetic ring unit may be provided. This switching may be implemented by, for example, switch unit 1040 in FIG. 10, as discussed below with reference to FIG. 14. In some embodiments, the switching may include rebooting a power supply unit that supplies power to the magnetic ring unit, suspending transmission of the downlink data by the magnetic ring unit, performing uplink data monitor, timing the uplink data monitor, and notifying the uplink/downlink switch unit to reboot the transmission of the downlink data by the magnetic ring unit.

In a further embodiment, method 1300 can include, at step 1306, receiving the uplink data by the rangefinder and, at step 1308, performing a control action on the rangefinder, such as a restart, firmware update, recalibration, or the like.

FIG. 14 illustrates a method of operating a range-finding system, according to embodiments of the disclosure. As shown in FIG. 14, a method 1400 can include, at step 1402, receiving downlink data via a magnetic ring unit including one or more communication channels. An example of step 1402 is illustrated in FIG. 12. Method 1400 can also include, at 1406, sending uplink data via the magnetic ring unit. An example of step 1406 is illustrated in FIG. 13. Method 1400 can further include, at step 1404, switching between the downlink transmission mode as performed at step 1402 and the uplink transmission mode as performed at step 1406. An example of a system that can be configured to implement method 1400 is shown in FIG. 6A. As mentioned in the discussion of FIG. 6A, the switching at step 1404 may be performed in accordance with a Fibonacci sequence or in numerous other ways, as mentioned above.

Consistent with some embodiments according to the present disclosure, another method of operating a range-finding system may include the steps of method 1200, and also the following steps: generating, by a power supply unit, a power signal, and supplying, via a power magnetic ring unit comprising one or more power channels, the power signal as uplink data from the power supply unit to the rangefinder. Each power channel may comprise a magnetic ring. The power channel may be different from the communication channel.

Consistent with some embodiments according to the present disclosure, a method of data communication within a magnetic-ring-based communication system includes switching between receipt of a downlink control signal and an uplink control signal; transmitting, via a mainboard control unit, a downlink data; receiving, via the mainboard control unit, an uplink data; transmitting, via a backboard control unit, an uplink data; receiving, via the backboard control unit, a downlink data; and transmitting, via a power channel, a power signal from the backboard control unit to the mainboard control unit. The communication channel may include a mainboard magnetic ring unit and a backboard magnetic ring unit. When the switch unit receives the downlink control signal, the mainboard control unit may transmit the downlink data to the backboard control unit via the communication channel. When the switch unit receives the uplink control signal, the backboard control unit may transmit the uplink data to the mainboard control unit via the communication channel. The backboard control unit may supply power to the mainboard control unit via the power channel.

The method of data communication discussed above may further include: converting the downlink data into a downlink differential signal; amplifying the downlink differential signal; outputting a downlink analog signal by matching impedance of the amplified downlink differential signal; converting, at the mainboard magnetic ring unit, the downlink analog signal into electromagnetic energy; converting, at the backboard magnetic ring unit, the electromagnetic energy into a downlink analog signal; filtering the downlink analog signal; and converting the downlink analog signal into downlink data to be output to the backboard control unit.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc, a flash drive, or a solid-state drive having the computer instructions stored thereon.

It will be apparent to those skilled in the art that various modifications and variations can be made to the disclosed systems and related methods. Other embodiments will be apparent to those skilled in the art from consideration of the specification and practice of the disclosed systems and related methods.

It is intended that the specification and examples be considered as exemplary only, with a true scope being indicated by the following claims and their equivalents.

What is claimed is:

1. A magnetic-ring-based communication system, comprising:
   a mainboard controller;
   a backboard controller;
   a communication channel through which the mainboard controller is configured to transmit downlink data to the backboard controller and the backboard controller is configured to transmit uplink data to the mainboard controller;
   a power channel through which the backboard controller is configured to transmit power supply to the mainboard controller;
   a switch configured to receive a downlink control signal and an uplink control signal;
   a downlink signal converter configured to receive the downlink data transmitted from the mainboard controller and convert the downlink data into a downlink differential signal;
   a downlink driver configured to receive the downlink differential signal transmitted from the downlink signal converter and amplify the downlink differential signal to obtain an amplified downlink differential signal; and
   a downlink impedance matcher configured to receive the amplified downlink differential signal, match impedance of the amplified downlink differential signal, and output a downlink analog signal, wherein a mainboard magnetic ring unit is configured to receive the downlink analog signal, convert the downlink analog signal into electromagnetic energy and transmit the electromagnetic energy to a backboard magnetic ring unit,
   wherein the communication channel comprises the mainboard magnetic ring unit connecting the mainboard controller and the communication channel and the backboard magnetic ring unit connecting the backboard controller and the communication channel,
   wherein in response to the switch receiving the downlink control signal, the switch switches to a downlink transmission status and the mainboard magnetic ring unit transmits the downlink data comprising the electromagnetic energy to the backboard magnetic ring unit, and
   wherein in response to the switch receiving the uplink control signal, the switch switches to an uplink transmission status and the backboard magnetic ring unit is configured to transmit the uplink data to the mainboard magnetic ring unit.

2. The magnetic-ring-based communication system of claim 1, wherein the backboard controller is configured to send the downlink control signal and the uplink control signal to the switch.

3. The magnetic-ring-based communication system of claim 1, wherein the power channel comprises a power magnetic ring comprising a mainboard power magnetic ring unit and a backboard power magnetic ring unit.

4. The magnetic-ring-based communication system of claim 3,
   wherein the electromagnetic energy is first electromagnetic energy; and
   wherein the system further comprises:
      a power signal driver which is configured to receive a power signal from the backboard controller and amplify the power signal; and
      a resonance unit which is configured to receive the amplified power signal from the power signal driver, convert the amplified power signal into a resonant signal and send the resonant signal to the backboard power magnetic ring unit, wherein the backboard power magnetic ring unit is configured to convert the resonant signal into third electromagnetic energy and transmit the third electromagnetic energy to the mainboard power magnetic ring unit.

5. The magnetic-ring-based communication system of claim 3,
   wherein the electromagnetic energy is first electromagnetic energy; and
   wherein the mainboard power magnetic ring unit is configured to receive third electromagnetic energy from the backboard power magnetic ring unit and convert the third electromagnetic energy into an AC power signal; and
   wherein the system further comprises:
      a full-wave rectifier which is configured to receive the AC power signal and convert the AC power signal into a DC power signal; and
      a voltage regulator which is configured to receive the DC power signal from the full-wave rectifier, regulate the DC power signal, and output the DC power signal to the mainboard controller.

6. The magnetic-ring-based communication system of claim 1, wherein the backboard magnetic ring unit is configured to receive the electromagnetic energy from the mainboard magnetic ring unit and convert the electromagnetic energy into the downlink analog signal, the system further comprising:
   a downlink signal detector, which is configured to receive the downlink analog signal from the backboard magnetic ring unit and filter the downlink analog signal; and
   a downlink AD converter which is configured to receive the filtered downlink analog signal, convert the filtered downlink analog signal into the downlink data and output the downlink data to the backboard controller.

7. The magnetic-ring-based communication system of claim 6, wherein the switch comprises:
   a control port through which the switch is configured to receive the downlink control signal;
   a magnetic ring port coupled to the backboard magnetic ring unit through which the switch is configured to receive the downlink analog signal; and
   a downlink conduction port coupled to the downlink signal detector through which the switch is configured to transmit the downlink analog signal to the downlink signal detector.

8. The magnetic-ring-based communication system of claim 1,
   wherein the electromagnetic is first electromagnetic energy; and
   wherein the system further comprises:
      an uplink signal converter which is configured to receive the uplink data transmitted from the backboard controller and convert the uplink data into an uplink differential signal;
      an uplink driver which is configured to receive the uplink differential signal transmitted from the uplink signal converter and amplify the uplink differential signal to obtain an amplified uplink differential signal; and
      an uplink impedance matcher which is configured to receive the amplified uplink differential signal, match impedance of the amplified uplink differential signal and output an uplink analog signal, wherein the backboard magnetic ring unit is configured to receive the uplink analog signal, convert the uplink analog signal into second electromagnetic energy and transmit the second electromagnetic energy to the mainboard magnetic ring unit.

9. The magnetic-ring-based communication system of claim 8, wherein the switch comprises:
- a control port through which the switch is configured to receive the uplink control signal;
- an uplink conduction port coupled to the uplink impedance matcher through which the switch is configured to receive the uplink analog signal; and
- a magnetic ring port coupled to the backboard magnetic ring unit through which the switch is configured to send the uplink analog signal to the mainboard magnetic ring unit.

10. The magnetic-ring-based communication system of claim 1,
wherein the electromagnetic energy is first electromagnetic energy; and
wherein the mainboard magnetic ring unit is configured to receive second electromagnetic energy from the backboard magnetic ring unit and convert the second electromagnetic energy into an uplink analog signal, further comprising:
- an uplink signal detector which is configured to receive the uplink analog signal from the mainboard magnetic ring unit and filter the uplink analog signal; and
- an uplink AD converter which is configured to receive the filtered uplink analog signal, convert the filtered uplink analog signal into the uplink data and output the uplink data to the mainboard controller.

11. The magnetic-ring-based communication system of claim 1, wherein the communication channel and the power channel are physically separated.

12. The magnetic-ring-based communication system of claim 1, wherein the communication channel comprises a magnetic ring that further comprises:
- an inner ring with an inner axis passing through a center of the inner ring; and
- an outer ring with an outer axis passing through a center of the outer ring,
- wherein the inner axis and the outer axis coincide with each other; and
- wherein in response to the mainboard controller and the backboard controller transmitting data with each other, the inner ring and the outer ring relatively rotate to transmit the data.

13. The magnetic-ring-based communication system of claim 12, further comprising a rotating part, wherein at least one of the inner ring or the outer ring is connected to the rotating part and rotates around a center axis of the at least one of the inner ring or the outer ring.

14. The magnetic-ring-based communication system of claim 12, wherein the inner ring comprises an inner coil and the outer ring comprises an outer coil,
wherein in response to the inner ring and the outer ring relatively rotating, the inner coil and the outer coil generate an electromagnetic field to transmit the data between the mainboard controller and the backboard controller.

15. The magnetic-ring-based communication system of claim 12, wherein a space is provided between the inner ring and the outer ring.

16. A method for magnetic-ring-based communication, comprising:
- receiving a downlink control signal by a switch to switch to a downlink transmission status;
- generating downlink data by a mainboard controller;
- converting the downlink data into a downlink differential signal by a downlink signal converter;
- amplifying the downlink differential signal by a downlink driver;
- matching impedance of the amplified downlink differential signal by a downlink impedance matcher configured to output a downlink analog signal;
- converting the downlink analog signal into electromagnetic energy by a mainboard magnetic ring unit;
- transmitting the electromagnetic energy by the mainboard magnetic ring unit to a backboard magnetic ring unit;
- converting the electromagnetic energy into the downlink analog signal by the backboard magnetic ring unit;
- filtering the downlink analog signal by a downlink signal detector;
- converting the filtered downlink analog signal into the downlink data and sending the downlink data to a backboard controller by a downlink AD converter; and
- transmitting the downlink data through a communication channel to the backboard controller,
- wherein the communication channel comprises the mainboard magnetic ring unit and the backboard magnetic ring unit.

17. A method for magnetic-ring-based communication, comprising:
- receiving an uplink control signal by a switch to switch to uplink transmission status;
- generating uplink data by a backboard controller;
- converting the uplink data into an uplink differential signal by an uplink signal converter;
- amplifying the uplink differential signal by an uplink driver;
- matching impedance of the amplified uplink differential signal by an uplink impedance matcher configured to output an uplink analog signal;
- converting the uplink analog signal into electromagnetic energy by a backboard magnetic ring unit;
- transmitting the electromagnetic energy by the backboard magnetic ring unit to a mainboard magnetic ring unit;
- converting the electromagnetic energy into the uplink analog signal by the mainboard magnetic ring unit;
- filtering the uplink analog signal by an uplink signal detector;
- converting the filtered uplink analog signal into the uplink data by an uplink AD converter; and
- transmitting the uplink data through a communication channel to a mainboard controller,
- wherein the communication channel comprises the backboard magnetic ring unit and the mainboard magnetic ring unit.

* * * * *